(12) United States Patent
Mihara

(10) Patent No.: US 6,643,072 B2
(45) Date of Patent: Nov. 4, 2003

(54) ELECTRONIC PICTURE TAKING APPARATUS HAVING A ZOOM LENS SYSTEM

(75) Inventor: Shinichi Mihara, Tama (JP)

(73) Assignee: Olympus Corporation, Tokyo (JP)

( * ) Notice: Subject to any disclaimer, the term of this patent is extended or adjusted under 35 U.S.C. 154(b) by 226 days.

(21) Appl. No.: 09/899,925

(22) Filed: Jul. 9, 2001

(65) Prior Publication Data

US 2002/0027721 A1 Mar. 7, 2002

(30) Foreign Application Priority Data

Jul. 10, 2000 (JP) ...................................... 2000-207812

(51) Int. Cl.[7] .............................................. G02B 15/14
(52) U.S. Cl. ...................................... 359/686; 359/680
(58) Field of Search ........................ 359/686, 680–682, 359/676, 683

(56) References Cited

U.S. PATENT DOCUMENTS

| | | | | |
|---|---|---|---|---|
| 5,078,481 A | * | 1/1992 | Nakayama et al. | ......... 359/680 |
| 5,721,642 A | * | 2/1998 | Shibayama et al. | ......... 359/686 |
| 5,999,329 A | * | 12/1999 | Ohtake | ......... 359/686 |
| 6,088,169 A | | 7/2000 | Ohno | ......... 359/682 |
| 6,124,984 A | | 9/2000 | Shibayama et al. | ......... 359/689 |
| 6,124,987 A | | 9/2000 | Kayanuma et al. | ......... 359/692 |
| 6,185,048 B1 | | 2/2001 | Ishii et al. | ......... 359/687 |

FOREIGN PATENT DOCUMENTS

| | | | | |
|---|---|---|---|---|
| JP | 6-51203 | * | 2/1994 | |
| JP | Hei11-194274 | | 7/1999 | ........... G02B/15/20 |
| JP | Hei11-287953 | | 10/1999 | ........... G02B/15/16 |

* cited by examiner

Primary Examiner—Jordan M. Schwartz
(74) Attorney, Agent, or Firm—Kenyon & Kenyon

(57) ABSTRACT

An electronic picture taking apparatus comprises a zoom lens system and an image pickup device. The zoom lens system has a type of movement suitable for stable, high performance in the range from infinite to near distance and being thoroughly reduced the thickness. The zoom lens system comprises at least four lens units. A foremost first lens unit on the object side of said zoom lens system has a negative refractive power. Each of three consecutive lens units has variable space on the image side thereof between an adjacent lens unit for performing a zooming operation. A rearmost lens unit of the zoom lens system consists of a single positive lens element having an aspherical surface and being fixed during the zooming operation. The zoom lens system includes an aperture stop moving incorporated with the second lens unit which is adjacent to the first lens unit. The electronic picture taking apparatus satisfies the following condition:

$$1.5 < L2/Y < 3.5 \qquad (1)$$

wherein $L2$ is an amount of movement of the second lens unit in the direction of optical axis thereof while performing the zooming operation from a wide angle end to a telephoto end, and $Y$ is a length of a diagonal line of an effective image receiving area of the image pickup device.

16 Claims, 14 Drawing Sheets

C: CYAN    M: MAGENTA
Ye: YELLOW    G: GREEN

ELECTRONIC PICTURE TAKING APPARATUS HAVING A ZOOM LENS SYSTEM

CROSS-REFERENCE TO RELATED APPLICATIONS

This invention claims benefit of Patent Application No. 2000-207812, filed on Jul. 10, 2000, in Japan, the contents of which is hereby incorporated by reference.

BACKGROUND OF THE INVENTION

1. Field of the Invention

This invention relates to an electronic picture taking apparatus, and more particularly to a video camera, a digital camera or the like, small in depth in spite of using a zoom lens system as a taking lens.

2. Description of the related Art

In recent years, digital cameras (electronic cameras) have come to attention as a next-generation camera instead of the 35 mm film cameras (commonly called Leica size film camera). Digital cameras are categorized in several classes from a large professional-grade model having extremely high performance to a portable small consumer model.

As to the consumer model, the need for minimization of camera depth has intensified in the marketplace. However, it is difficult to realize such a small camera because the size of the optical system, particularly the distance from the front surface to the image plane of the zoom lens is large. Lately, a so-called collapsible mechanism has come to be mainstream of the camera body structure in which the lens barrel can be telescopically collapsible into the camera body. When the camera is in use, the lens barrel goes into the camera body, reducing its depth. Whereas, when the camera is used for picture taking, the lens barrel comes out of the camera body. However, the depth of the camera body in the collapsed state varies greatly depending on the type of the zoom lens and filters used. When the specification of the zoom lens such as zoom ratio or F-number is set in high level, a positive lead type zoom lens having a positive foremost lens unit tends to have thick lens elements and deep airspace therebetween, and therefore, depth of the camera body does not become small even when the collapsible mechanism is adopted. (Japanese Patent Application Unexamined Publication (KOKAI) No. Hei 11-258507(1999)).

A negative lead type zoom lens having a negative foremost lens unit has no such problem when it consists of only two or three lens units. However, in negative lead type zoom lens systems, the number of lens elements in each lens unit is large or each lens elements is thick, so the depth of camera body does not become very small even if the negative lead type zoom lens and the collapsible mechanism are adopted. (Japanese Patent Application Unexamined Publication (KOKAI) No. Hei 11-52246(1999)).

Conventional zoom lens systems suitable for an electronic picture taking apparatus, having good imaging performance including zoom ratio, angle of view and F-number etc., and being expected to reduce depth of the camera when the lens system is collapsed, are disclosed in Japanese Patent Application Unexamined Publication (KOKAI) Nos. Hei 11-194274(1999), Hei 11-284953(1999) and 2000-9997 (2000).

For reducing the thickness of the foremost first lens unit of the zoom lens system, it is desirable to make the position of the entrance pupil shallow, that is, to make the distance from the object side surface of the first lens unit to the entrance pupil small. To realize this, it is necessary to make the magnification of the second lens unit large. However, as the magnification of the second lens unit becomes greater, it becomes difficult to make the thickness of the second lens unit small because of the great share of magnification loaded to the second lens unit, and moreover, the difficulty of manufacture and the sensitivity to manufacturing error increases with undesirable results.

It is possible to minimize the camera depth and size using a small image pickup device. However, to maintain a constant number of pixel element, the pitch and size of pixel elements must be small and the sensitivity of the image pickup device inevitably decreases. Therefore a large aperture zoom lens must be used to compensate for the sensitivity. The adverse effect on resolution due to the diffraction of light also must be compensated for by the zoom lens.

To reduce the depth of camera body, it is effective for the layout of the focusing lens driving mechanism to adopt the rear focusing system in which the lens unit other than the first lens unit is used for focusing. In this case, a zoom lens system having a small change in aberration during focusing is required.

SUMMARY OF THE INVENTION

Reduction of the depth of an electronic picture taking apparatus is achieved by reducing the thickness of the optical system. As to the picture taking lens, it is reduced in thickness by reducing the number of lens elements, selecting the type of movement of lens units, such as a rear focusing system which is suitable for making the lens driving mechanism small and simple and effectively provides a stable imaging performance from the wide angle end to the telephoto end, and moreover reducing the thickness of each lens unit by reducing the thickness of each lens element. In addition, by selecting appropriate arrangement and structure of the filters, the depth of the optical system as a whole is thoroughly minimized.

DETAILED DESCRIPTION OF THE EXAMPLES OF THE INVENTION

Figure 1:
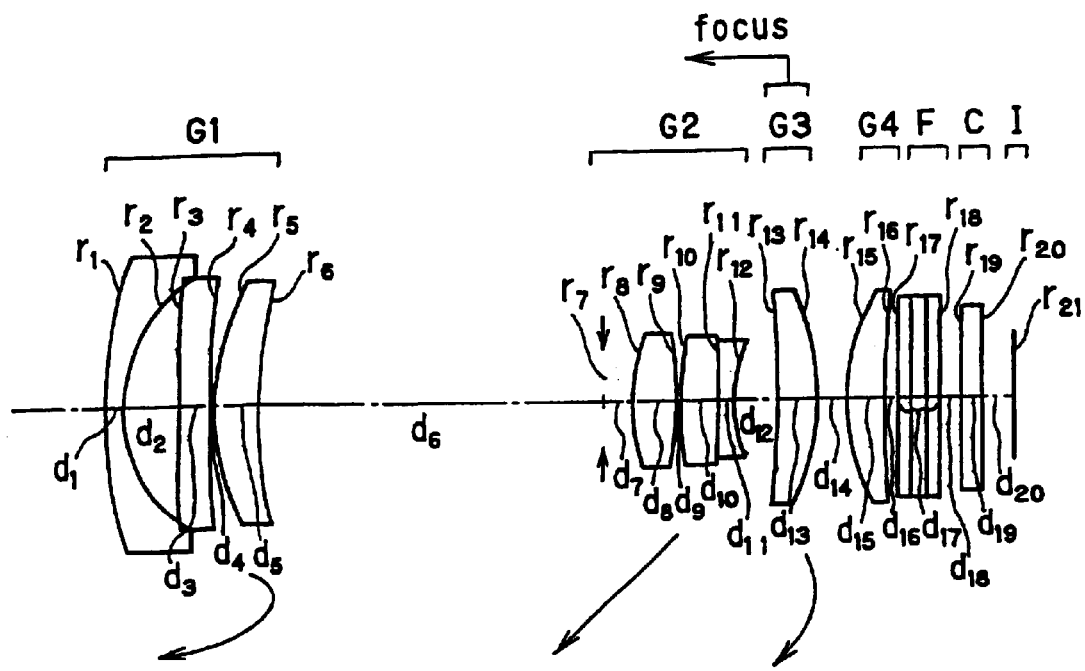
FIG. 1 is a sectional view of a first example of a zoom lens system used in this invention

The first type of an electronic picture taking apparatus according to this invention comprises a zoom lens system and an electronic image pickup device. The zoom lens system comprises at least four lens units. A foremost first lens unit on the object side of the zoom lens system has a negative refractive power. Each of foremost three consecutive lens units from said first lens unit has variable space on the image side thereof for performing a zooming operation. A rearmost lens unit of the zoom lens system consists of a single positive lens element having an aspherical surface and is fixed while performing zooming operation. The zoom lens system includes an aperture stop moving incorporated with the second lens unit disposed adjacent to the first lens unit. The electronic picture taking apparatus satisfies the following condition:

$$1.5 < L2/Y < 3.5 \tag{1}$$

where L2 is the distance the second lens unit moves in the direction of the optical axis while performing a zooming operation from the wide angle end to the telephoto end, and Y is the length of a diagonal line of an effective image receiving area (rectangular shape) of the image pickup device.

The lens configuration is simple and suitable for reducing the thickness of each lens unit, and further the imaging performance is stable during performing both zooming and focusing operations. Besides, the change of F-number caused by zooming is small. However, as the aperture stop moves largely during zooming operation, change of position of the exit pupil tends to become large. To reduce this change, the movement of the second lens unit is limited to meet the condition (1). When the parameter L2/Y becomes large beyond the upper limit 3.5 of condition (1), angle of incidence of the principle ray to the image surface becomes undesirably large either at the wide angle end or the telephoto end. Whereas, when the parameter L2/Y becomes small beyond the lower limit 1.5 of condition (1), the variation of astigmatism become undesirably large either at the wide angle end or the telephoto end.

When the condition (1) is modified as the following, more favorable result will be obtained.

$$1.6 < L2/Y < 3.3 \tag{1-1}$$

When the condition (1) is modified as below, an even more favorable result will be obtained.

$$1.7 < L2/Y < 3.0 \tag{1-2}$$

The condition $1.6 < L2/Y < 3.0$ or $1.7 < L2/Y < 3.3$ also provides favorable results.

The second type of an electronic picture taking apparatus according to this invention comprises a zoom lens system and an electronic image pickup device. The zoom lens system comprises a first negative lens unit, a second positive lens unit, a third positive lens unit, and a fourth positive lens unit in order from an object side. The space between the second lens unit and third lens unit increases during zooming operation from a wide angle end to a telephoto end at a state to be focused on an infinite object. Focusing on the object in nearer range of the zoom lens system is performed by moving the third lens unit toward the object side. The fourth lens unit consists of a single positive lens element having an aspherical surface. The zoom lens system satisfies the following condition (2):

$$-1.2 < exPW/exPT < 0 \tag{2}$$

where exPW and exPT designate a distance from an image plane to an exit pupil of the zoom lens system at wide angle end and at the telephoto end, respectively when the zoom lens system is focused at an infinite object.

In this zooming format, condition (2) should be satisfied to keep the movement of the exit pupil of the zoom lens during zooming from the wide angle end to the telephoto end small. When the upper limit 0 is violated, shading effects tend to occur at the wide angle end. When the lower limit −1.2 is violated, shading effects tend to occur at the telephoto end.

When the condition (2) is modified as the following, more favorable result will be obtained.

$$-1.1 < exPW/exPT < -0.2 \tag{2-1}$$

When the condition (2) is modified as below, an even more favorable result will be obtained.

$$-1.0 < exPW/exPT < -0.4 \tag{2-2}$$

The condition $-1.1 < exPW/exPT < -0.4$ or $-1.0 < exPW/exPT < -0.2$ also provides favorable results.

The third type of an electronic picture taking apparatus according to this invention comprises a zoom lens system and an electronic image pickup device. The zoom lens system comprises a first negative lens unit, a second positive lens unit, a third positive lens unit, and a fourth positive lens unit in order from an object side. The space between the second lens unit and the third lens unit increases during zooming operation from the wide angle end to the telephoto end at a state to be focused on an infinite object. Focusing on the object in nearer range of the zoom lens system is performed by moving the third lens unit toward the object side. The second lens unit consists of, in order from an object side, a single lens element having an aspherical surface and a cemented lens component composed of a positive lens element and a negative lens element from the object side. The third lens unit consists of a single positive lens element. The zoom lens system satisfies the following conditions (3) and (4):

$$-1.5 < (R2C1+R2C2)(R2C2-R2C3)/(R2C1-R2C2)(R2C2+R2C3) < -0.3 \quad (3)$$

$$0.05 < t2N/t2 < 0.3 \quad (4)$$

where R2C1, R2C2 and R2C3 are radiuses of curvature measured on an optical axis of a first surface, a second surface and a third surface of the cemented lens component in the third lens unit, respectively, t2N is the thickness of the negative lens element of the cemented lens component on the optical axis, and t2 is the entire thickness of the second lens unit on the optical axis.

The condition (3) establishes the ratio of the shape factor of the positive lens element of the cemented lens component to that of the negative lens of the cemented lens component. When the lower limit −1.5 is violated, it is undesirable to correct axial chromatic aberration. On the contrary, when the upper limit −0.3 is violated, the thickness of each lens element becomes large which is undesirable when minimizing the size of the zoom lens system.

The condition (4) determines the thickness of the negative lens element of the cemented lens component on the optical axis. To correct astigmatism, it is desirable to make this lens element thick. However, this doesn't meet the requirement to reduce the thickness of the lens element. Therefore, to correct astigmatism, an aspherical surface is adopted to this lens element. Even if that is done, when the lower limit 0.05 is exceeded, it becomes difficult to correct astigmatism favorably. Whereas, when the upper limit 0.3 is exceeded, the thickness of the lens element becomes undesirably large.

When the condition (3) is modified as the following, a more favorable result will be obtained.

$$-1.3 < (R2C1+R2C2)(R2C2-R2C3)/(R2C1-R2C2)(R2C2+R2C3) < -0.4 \quad (3\text{-}1)$$

When the condition (3) is modified as below, an even more favorable result will be obtained.

$$-1.2 < (R2C1+R2C2)(R2C2-R2C3)/(R2C1-R2C2)(R2C2+R2C3) < -0.5 \quad (3\text{-}2)$$

The condition $$-1.3 < (R2C1+R2C2)(R2C2-R2C3)/(R2C1-R2C2)(R2C2+R2C3) < -0.5$$

or $$-1.2 < (R2C1+R2C2)(R2C2-R2C3)/(R2C1-R2C2)(R2C2+R2C3) < -0.4$$

also provides favorable results.

As to condition (4), if it is modified according to the following, a more favorable result will be obtained.

$$0.06 < t2N/t2 < 0.28 \quad (4\text{-}1)$$

When the condition (4) is modified as below, an even more favorable result will be obtained.

$$0.07 < t2N/t2 < 0.26 \quad (4\text{-}2)$$

The condition $0.06 < t2N/t2 < 0.26$ or $0.07 < t2N/t2 < 0.28$ also provides favorable results.

The fourth type of an electronic picture taking apparatus according to this invention comprises a zoom lens system and an electronic image pickup device. The zoom lens system comprises a first negative lens unit, a second positive lens unit, a third positive lens unit, and a fourth positive lens unit in order from an object side. The space between the second lens unit and third lens unit increases during zooming operation from the wide angle end to the telephoto end at a state to be focused on an infinite object. Focusing on the object in the nearer range of the zoom lens system being performed by moving the third lens unit toward the object side. The second lens unit consists of, in order from the object side, a positive lens component having an aspherical surface and a negative lens component. The third lens unit consists of a single positive lens element. The zoom lens system satisfies the following condition (5):

$$0.05 < t2NI/t2 < 0.3 \quad (5)$$

where t2NI is thickness of a negative lens element measured on the optical axis placed at a rearmost position in said second lens unit and t2 is a entire thickness of the second lens unit measured on the optical axis. In this specification, the word "lens component" means either a single lens or a cemented lens.

Condition (5) is set in order to balance the correction of astigmatism and the thickness of the second lens unit as well as the condition (4) and the upper limit and the lower limit have approximately the same technical meaning as the condition (4).

When the condition (5) is modified according to the following, a more favorable result will be obtained.

$$0.06 < t2NI/t2 < 0.28 \quad (5\text{-}1)$$

When the condition (5) is modified as below, an even more favorable result will be obtained.

$$0.07 < t2NI/t2 < 0.26 \quad (5\text{-}2)$$

The condition $0.06 < t2NI/t2 < 0.26$ or $0.07 < t2NI/t2 < 0.28$ also provides favorable results.

Incidentally, in the zoom lens systems described above, when the zoom ratios become more than 2.3, it is effective to satisfy the conditions (a) and (b) below to reduce the thickness of the zoom lens systems.

$$0.9 < -\beta 23t < 1.8 \quad (a)$$

$$2.0 < f2/fW < 3.0 \quad (b)$$

where β23t is a composite magnification of the second and third lens units at a telephoto end when the zoom lens system is focused to an infinite object, f2 is the focal length of the second lens unit, and fW is the focal length of the zoom lens system as a whole at wide angle end when the zoom lens system is focused to an infinite object.

Condition (a) determines the composite magnification of the second and third lens units at the telephoto end when the zoom lens system is focused to an infinite object. It is desirable to increase the absolute value of this magnification for making the position of the entrance pupil shallow and reducing the diameter of the first lens unit small. This contributes to reduce the thickness of the first lens unit. When the lower limit 0.9 of the condition (a) is exceeded, it becomes difficult to make the thickness sufficiently small. On the other hand, when the upper limit 1.8 of the condition (a) is exceeded, correction for aberrations, particularly spherical aberration, coma, and astigmatism become difficult.

The condition (b) imposes limit for the focal length of the second lens unit. To render the thickness of the second lens unit small, it is desirable to make the focal length of the second lens unit small. However, this arrangement makes the primary principal point of the second lens unit closer to an object side, or the secondary principal point of the first lens unit closer to the image side, and is undesirable for correction of aberrations.

When the lower limit 2.0 of the condition (b) is violated, correction of aberrations such as spherical aberration, coma and astigmatism tends to be difficult. When the upper limit 3.0 of the condition (b) is violated, it is difficult to make the second lens unit thin.

When the condition (a) is modified as the following, a more favorable result will be obtained.

$$0.9 < -\beta 23t < 1.7 \qquad (a\text{-}1)$$

When the condition (a) is modified as below, an even more favorable result will be obtained.

$$1.1 < -\beta 23t < 1.6 \qquad (a\text{-}2)$$

The condition $0.9 < -\beta 23t < 1.6$ or $1.1 < -\beta 23t < 1.7$ also provides favorable results.

When the condition (b) is modified as the following, more favorable result will be obtained.

$$2.1 < f2/fW < 2.8 \qquad (b\text{-}1)$$

When the condition (b) is modified below, further more favorable result will be obtained.

$$2.2 < f2/fW < 2.6 \qquad (b\text{-}2)$$

The condition $2.1 < f2/fW < 2.6$ or $2.2 < f2/fW < 2.8$ also provides favorable results.

In the zoom lens system according to this invention, the first lens unit can be composed of, in order from the object side, a negative subunit consisting of two negative lens elements and a positive subunit consisting of a single positive lens element, or composed of, in order from an object side, a negative lens component having less than three negative lens elements at least one of which has an aspherical surface, and a positive lens component having a positive lens element. These lens layouts in the first lens unit match with the construction of the second, third, and fourth lens unit for correcting aberrations. That is, the variation of aberrations during focusing operation is small and aberrations are well corrected at any position included in the variation range of the focal length of the zoom lens system.

In addition to this, it is favorable to satisfy the following conditions (6) and (7).

$$0.6 < t1/Y < 2.2 \qquad (6)$$

$$0.3 < t2/Y < 1.5 \qquad (7)$$

where t1 is thickness of the first lens unit measured from the foremost surface to rearmost surface thereof on the optical axis, t2 is thickness of the second lens unit measured from the foremost surface to rearmost surface thereof on the optical axis, and Y is length of the diagonal line of the effective image receiving area (rectangular shape) of the image pickup device.

The conditions (6) and (7) restrict the entire thickness of both the first and second lens units. The violation of the upper limits of the condition (6) and (7) are likely to be an obstacle to reducing the thickness of these lens units. When the lower limits of the conditions (6) and (7) are exceeded, radius of curvature of each lens element in these lens units is inevitably large and the optical power of the lens element in these lens units becomes weak. Therefore, it becomes difficult to establish suitable optical power distribution and to correct aberrations favorably.

These conditions (6) and (7) should be modified dependent on the Y value to keep the edge thickness of the lens elements for holding and space for the lens holding and/or driving mechanism. More specifically, it is preferable to satisfy the conditions (6-1) and (7-1) shown below:

in the range of $Y \leq 6.2$ mm $$0.8 < t1/Y < 2.2$$

in the range of $6.2$ mm $< Y \leq 9.2$ mm $$0.7 < t1/Y < 2.0$$

in the range of $9.2$ mm $< Y$ $$0.6 < t1/Y < 1.8 \qquad (6\text{-}1)$$

in the range of $Y \leq 6.2$ mm $$0.5 < t2/Y < 1.5$$

in the range of $6.2$ mm $< Y \leq 9.2$ mm $$0.4 < t2/Y < 1.3$$

in the range of $9.2$ mm $< Y$ $$0.3 < t2/Y < 1.1 \qquad (7\text{-}1)$$

The zoom lens system according to this invention has a rearmost image side lens component fixed during zooming operation and including an aspheric lens element, and a lens unit movable for focusing operation adjacent to the object side of the rearmost lens component. This arrangement brings the following advantages.

The electronic picture taking apparatus such as a digital camera often includes an optical element for bending the optical path between the rearmost lens component and the focusing lens unit disposed just before the rearmost lens component. The aberration of the imaging optical system usually deteriorates when reducing the number of lens elements or to bend the optical path. Off axial aberrations can be corrected to adopt an aspherical surface in the rearmost lens component. However, when the aberration correcting effect of the aspherical surface is made strong, aberration change becomes large if the rearmost lens moves as the focusing lens. To avoid this and to achieve both correction of aberration and suppression of aberration change at the same time, it is preferable to share the focusing function and aberration correcting function between different lens units.

This arrangement is also applicable to the zoom lens system having a first negative lens unit, a second positive lens unit, a third lens unit being used as a focusing lens, and a fourth lens unit.

The rearmost lens component or the fourth lens unit should have a positive refractive power to make the principal ray impinge nearly perpendicularly onto the image receiving surface of the image pickup device, that is, to construct the picture taking optical system substantially as a telecentric system. To reduce the number of lens elements, it is desirable that the rearmost lens component or the fourth lens unit is composed of only one single aspherical lens element.

When constructing the zoom lens as a negative lead type in which a negative first lens unit exists at a foremost object side position, it is desirable to move the positive lens unit(s) disposed on the image side of the first lens unit monotonically toward the object side for zooming operation from the wide angle end to the telephoto end. To compensate for the shift of the focal point caused by zooming, it is preferable to provide at least two positive lens units on the image side of the first lens unit and to move both the first lens unit and these two positive lens units for zooming, particularly, to move these two positive lens units monotonically toward the object side respectively while changing the space between them. Here, the phrase "to move monotonically toward the object side" means that the lens unit only moves toward the object side and never moves toward the image side in its locus during zooming from the wide angle end to the telephoto end. The lens construction that the first lens unit moves during zooming is preferable to make the amount of movement of the second lens unit small. It contributes to minimize the thickness of the entire zoom lens system during zooming and to render the zoom ratio high.

When the lens configuration is adopted in which at least three lens units are provided on the image side of the first negative lens unit and each pair of lens units in consecutive four lens units from the first lens unit has a variable pace between them for performing zooming or focusing operation, it is effective to move the aperture stop of the zoom lens system together with the second lens unit disposed adjacent on the image side of the first lens unit during zooming operation to lessen the diameter of the first lens unit and to reduce the aberration change.

To reduce the number of the lens elements and correct aberration at the same time, the second lens unit may include a single lens element having an aspherical surface and a cemented lens component composed of a positive lens element and a negative lens element in this order from the object side, and it is also preferable that the third lens unit consists of a single positive lens element. Alternatively, it is preferable that the second lens unit consists of a positive lens component having an aspherical surface and a negative lens component, and the third lens unit consists of a positive lens element.

In the zoom lens system according to this invention, the aberration change over the entire zooming range is decreased mainly by reducing the aberration change generated by the movable lens units for zooming operation, and the residual aberration, particularly off axial aberration, is corrected by the aspherical surface provided in the rearmost lens component or the fourth lens unit. However, it is difficult to correct coma when the distance between the image plane and the lens surface to contribute to correct coma become too small. Therefore, the following condition (8) is established to correct coma favorably:

$$0.3 < DR/Y < 2.5 \tag{8}$$

wherein DR is a distance between the image side surface of the rearmost lens component or the fourth lens unit and the image plane, and Y is a length of a diagonal line of the effective image receiving surface of the image pickup device.

When the lower limit 0.3 is exceeded, it is preferable to correct distortion but becomes difficult to correct coma favorably by the aspherical surface provided in the rearmost lens component or the fourth lens unit. When the upper limit 2.5 is exceeded, the length of the entire lens system and the diameters of the lens elements positioned away from the aperture stop tends to be large.

When the condition (8) is modified as below, more favorable result will be obtained.

$$0.4 < DR/Y < 2.0 \tag{8-1}$$

When the condition (8) is modified as below, an even more favorable result will be obtained.

$$0.5 < DR/Y < 1.5 \tag{8-2}$$

To minimize the length of the entire lens system in spite of keep a desired minimum distance between the image plane and the image side surface of the rearmost lens component or the fourth lens unit, it is better that the distance D34 between the rearmost lens component or the fourth lens unit and the lens unit just before them to meet the following condition (9):

$$0.05 < D34/Y < 0.8 \tag{9}$$

wherein D34 is measured at the wide angle end when the zoom lens system is focused on an object at infinity.

When the upper limit 0.8 is violated, the length of the entire lens system becomes large or it becomes difficult to maintain the zooming ratio large. The lower limit 0.08 is established to prevent the rearmost lens component or the fourth lens unit from interfering with the lens unit just before them.

When the condition (9) is modified as below, more favorable result will be obtained.

$$0.05 < D34/Y < 0.6 \tag{9-1}$$

When the condition (9) is modified as below, an even more favorable result will be obtained.

$$0.05 < D34/Y < 0.4 \tag{9-2}$$

Up to this point, the measure for reducing the thickness of the zoom lens system when collapsible mechanism is used and for correcting aberrations favorably is explained.

Next, description is given for measure to minimize the thickness of the filters.

An electronic picture taking apparatus usually includes an infrared light absorbing filter in front of the image pickup device thick enough to prevent infrared light from impinging onto the image receiving surface of the image pickup device. To replace the absorbing filter with an interference filter primarily contributes to reducing thickness of the filter. Besides, this brings about secondary effects described below.

The near-infrared light blocking interference thin film which has a spectral transmittance of more than 80% at wavelength of 600 nm and less than 10% at wavelength of 700 nm, has higher transmittance than the absorbing filter in the wavelength red region. So, when such thin film is placed in the optical path on the object side of the image pickup device, the drawback of the image pickup device equipped with a complementary color filter that violet tends to turn to magenta is removed and a color reproduction comparative to the image pickup device equipped with a primary color filter can be obtained. The complementary color filter has higher transmittance than the primary color filter and to use the complementary color filter as the color encoding filter makes it possible to make the size of each pixel element of the image pickup device and to obtain high resolution. It is especially advantageous when a small size image pickup device is used.

An electronic picture taking apparatus is comprised of an optical low-pass filter (hereinafter abbreviated OLPF) on the object side of the image pickup device to eliminate moire or alias. When a birefringent filter that spatially splits incident light ray into ordinary light ray and extraordinary light ray is used as an OLPF, the entire thickness tLPF thereof on the optical axis satisfies the following condition:

$$0.15 \times 10^3 < tLPF/a < 0.45 \times 10^3 \tag{10}$$

where a is pitch of pixel elements in the horizontal scanning direction of the image pickup device.

This kind of OLPF is usually made of monocrystal plate such as quartz.

Making the thickness of the OLPF small is effective for reducing the thickness of the electronic picture taking apparatus when the lens is collapsed. However, this is usually undesirable because it lessens the moire suppression effect of the OLPF. However, as the pitch of pixel elements of the image pickup device become smaller, the frequency response of the imaging lens system at or higher than Nyquist limit frequency of the image pickup device decreases due to the influence of diffraction, and therefore, the poor moire suppression effect of the OLPF can be tolerated. For example, when the OLPF is composed of three monocrystal plates arranged in such a manner that their direction of crystal axes lies in +45 degrees from the horizontal scanning direction of image pickup device, 0 degree (parallel to the horizontal scanning direction), and −45 degrees from the horizontal scanning direction in this order, is known as a conventional OLPF. In this OLPF, when separation between ordinary rays and extraordinary rays produced by these plate is set to SQRT(½)×a (μm) in +45 degrees direction, a(μm) in horizontal direction, and SQRT(½)×a (μm) in −45 degrees direction, thickness of the OLPF is smallest. Here, SQRT means square root. In this case, thickness of the OLPF is around $[1+2 \times SQRT(½)] \times a \times 10^3 \times 5.88$ (mm). This filter has a cutoff at a frequency corresponding to the Nyquist limit of the image pickup device. If the thickness of the OLPF is several or several tens of percent thinner than that described above, the frequency response of the OLPF appears to be small at the frequency corresponding to the Nyquist limit of the image pickup device. However, due to the influence of diffraction, the composite frequency response of the zoom lens system and OLPF filter is negligible and moiré can be suppressed.

Even in other constructions of OLPF such that the OLPF is composed of two or one monocrystal plate, it is preferable to make the OLPF satisfy above condition (10).

When the upper limit $0.45 \times 10^3$ of condition (10) is exceeded, the OLPF becomes too thick to minimize the thickness of the imaging optical system. Whereas, when the lower limit $0.15 \times 10^3$ of condition (10) is exceeded, the moire suppression effect becomes insufficient. It is particularly preferable to make the OLPF satisfy condition (10) when a is equal to or less than 5 μm.

When a is equal to or less than 4 μm, it is desirable to modify the condition (10) to condition (10-1) shown below:

$$0.13 \times 10^3 < tLPF/a < 0.42 \times 10^3 \tag{10-1}$$

When the OLPF consists of three filter plates stacked with each other and the pixel pith is in the range of 4 μm≦a<5 μm, it is desirable to modify the condition (10) to condition (10-2) shown below:

$$0.3 \times 10^3 < tLPF/a < 0.4 \times 10^3 \tag{10-2}$$

When the OLPF consists of two filter plates stacked with each other and the pixel pith is in the range of 4 μm≦a<5 μm, it is desirable to modify the condition (10) to condition (10-3) shown below:

$$0.2 \times 10^3 < tLPF/a < 0.28 \times 10^3 \tag{10-3}$$

When the OLPF consists of one filter plate and the pixel pith is in the range of 4 μm≦a<5 μm, it is desirable to modify the condition (10) to condition (10-4) shown below:

$$0.1 \times 10^3 < tLPF/a < 0.16 \times 10^3 \tag{10-4}$$

When the OLPF consists of three filter plates stacked with each other and the pixel pith is in the range of a<4 μm, it is desirable to modify the condition (10) to condition (10-5) shown below:

$$0.25 \times 10^3 < tLPF/a < 0.37 \times 10^3 \tag{10-5}$$

When the OLPF consists of two filter plates stacked with each other and the pixel pith is in the range of a<4 μm, it is desirable to modify the condition (10) to condition (10-6) shown below:

$$0.16 \times 10^3 < tLPF/a < 0.25 \times 10^3 \tag{10-6}$$

When the OLPF consists of one filter plate and the pixel pith is in the range of a<4 μm, it is desirable to modify the condition (10) to condition (10-7) shown below:

$$0.08 \times 10^3 < tLPF/a < 0.14 \times 10^3 \tag{10-7}$$

When image pickup device having small pixel pitch is used, image quality deteriorates due to diffraction caused by small openings. To avoid this, illuminance of the image is adjusted by changing the transmittance of the opening of the aperture stop instead of changing the size thereof. Speaking specifically, adjustment of the amount of light transmitted is performed by preparing a plurality of openings having different transmittance and inserting one of them in the optical path between the first lens unit and the third lens unit. More specifically, at least two openings one of which has transmittance more than 80% at wavelength of 550 nm and the other of which has transmittance less than 80% at 550 nm are provided and inserted alternatively in the optical path.

It is possible to combine both change of the size of openings and alteration of transmittance of the opening to adjust the light amount. For instance, when F-number Fno is defined by focal length f of the zoom lens system and diameter ID of the entrance pupil with the following formula Fno=(f/ID), effective F-number Fno' is defined by the Fno and transmittance T of the opening at 550 nm with the following formula Fno'=Fno/SQRT(T), and the pixel pitch of the image pickup device in the horizontal scanning direction is represented by a, in case where the light amount is adjusted so as to satisfy the relationship Fno'=f/[ID×SQRT(T)]>a/0.4, a medium such as neutral density filter having transmittance less than 80% at 550 nm is inserted into the optical path of the zoom lens system. Namely, since adjustment of effective F-number Fno' can be carried out to change the diameter ID of the entrance pupil and the transmittance T, in case where the effective F-number Fno' is adjusted to greater than a/0.4, the transmittance must be adjusted to lower than 80%. Adopting this measure, the diameter of the opening becomes more than 10% greater than that in case where the transmittance is maintained at 100% and therefore, degradation of image quality due to diffraction is decreased. Under the condition where the above inequality is not satisfied, it is preferable to eliminate the medium having transmittance less than 80% or to use a medium having transmittance more than 91% at 550 nm and refractive index approximately same as the medium having transmittance less than 80%.

Another measure is also applicable in which a plurality of openings having sizes proportional to their F-numbers are prepared and OLPFs having different spatial frequency properties are disposed in each of the openings. As the size of opening inserted in the optical path becomes smaller, the degradation of image quality becomes greater. Therefore, it is preferable that the spatial frequency response of the OLPF is set to be large as the size of opening become small. Here, the phrase "spatial frequency response is large" means that the contrast of the image is high. One measure to realize this is to make cutoff frequency of the OLPF high.

Next, the zoom lens systems of the first through sixth examples used for the electronic picture taking apparatuses according to this invention are described in detail.

FIGS. 1 through 6 show sectional views of the zoom lens systems of the first through sixth examples at the wide angle end, focused on an object at infinity.

In each of these figures, G1 is the first lens unit, G2 is the second lens unit, G3 is the third lens unit, and G4 is the fourth lens unit. F is the OLPF composed of three filter elements and having an infrared light blocking thin film on the object side surface. C is a cover glass of the CCD (charge coupled device) image sensor as an image pickup device. I is an image plane which coincides with the image receiving surface of the CCD image sensor on which a complementary color filter array is provided. Both the OLPF F and cover glass C are fixed between the fourth lens unit and the image plane. In these figures, the arrow above the third lens unit G3 shows that the third lens unit is used for focusing and moves toward this direction when focusing to the object in nearer range is performed.

The zoom lens system of the first example according to this invention, as shown in FIG. 1, comprises a first negative lens unit G1, a second positive lens unit G2, a third positive lens unit G3, and a fourth positive lens unit G4 in this order from the object side. During zooming from the wide angle end to telephoto end while focused on the infinite object, the first lens unit G1 moves first toward the image side, then turns toward the object side, and at the telephoto end, reaches the position closer to the object than that at the wide angle end in the direction along the optical axis. The second lens unit G2 moves toward the object side. The third lens unit G3 first moves slightly toward the image side, then turns toward the object side, and at the telephoto end, reaches the same position as in the wide angle end in the direction along the optical axis. The fourth lens unit G4 is fixed during zooming. The space between the second lens unit G2 and the third lens unit G3 increases during zooming from the wide angle end to the telephoto end. Focusing on the object in nearer range from the zoom lens system is performed by moving the third lens unit G3 toward the object side.

The first lens unit G1 is composed of a first negative meniscus lens element having a convex surface on the object side, the second biconcave lens element and a third positive meniscus lens element having a convex surface on the object side. The second lens unit G2 is composed of a fourth biconvex lens and a fifth cemented lens component consisting of a biconvex lens element and biconcave lens element, and has an aperture stop just in front of the fourth biconvex lens element. The third lens unit G3 is composed of a sixth single positive meniscus lens element having a concave surface on the object side. The fourth lens unit G4 is composed of a seventh single positive meniscus lens element having a convex surface on the object side. Aspherical surfaces are provided on three lens surfaces of the object side surface of the biconcave lens element disposed in the middle of the first lens unit G1 (the object side surface of the second lens element), the most object side surface of the second lens unit G2 (the object side surface of the fourth lens element), and the object side surface of the fourth lens unit G4 (the object side surface of the seventh lens element).

Figure 2:
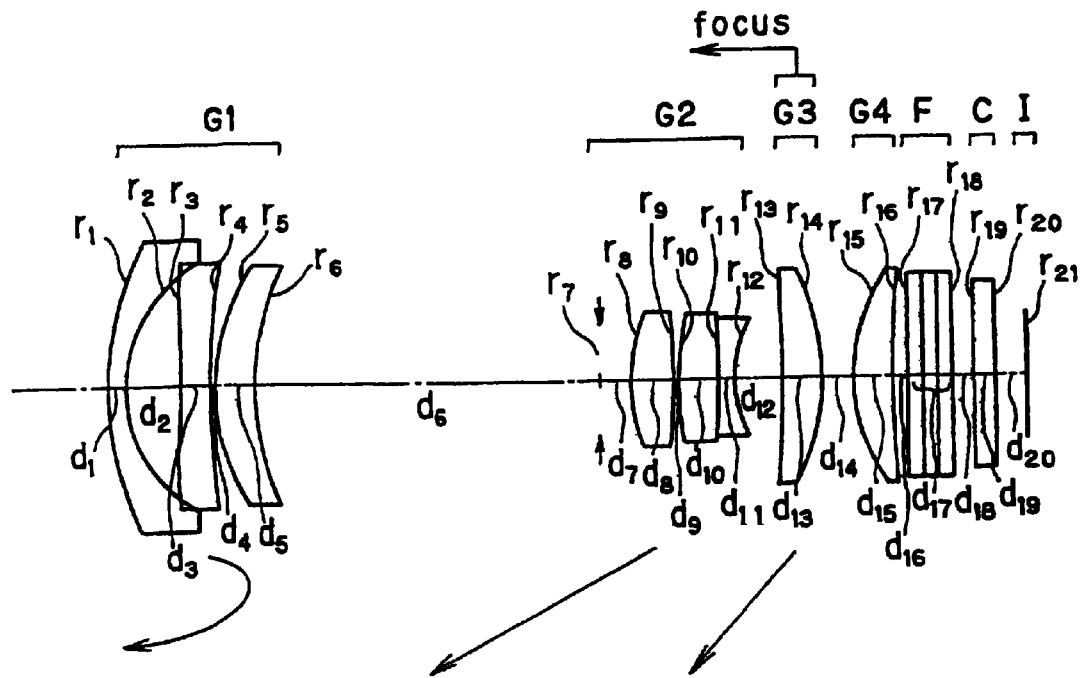
FIG. 2 is a sectional view of a second example of a zoom lens system used in this invention.

The zoom lens system of the second example according to this invention, as shown in FIG. 2, comprises a first negative lens unit G1, a second positive lens unit G2, a third positive lens unit G3, and a fourth positive lens unit G4 in this order from the object side. During zooming from the wide angle end to the telephoto end while focused on an infinite object, the first lens unit G1 moves first toward the image side, then turns toward the object side, and at the telephoto end, reaches the position closer to the object than that at the wide angle end in the direction along the optical axis. Both of the second lens unit G2 and the third lens unit G3 move toward the object side. The fourth lens unit G4 is fixed during zooming. The space between the second lens unit G2 and the third lens unit G3 increases during zooming from the wide angle end to the telephoto end. Focusing on the object in nearer range from the zoom lens system is performed by moving the third lens unit G3 toward the object side.

The first lens unit G1 is composed of a first negative meniscus lens element having a convex surface on the object side, a second biconcave lens element and a third positive meniscus lens element having a convex surface on the object side. The second lens unit G2 is composed of a fourth biconvex lens and a fifth cemented lens component consisting of a positive meniscus lens element and negative meniscus lens element each of which has its convex surface on the object side, and has an aperture stop just in front of the fourth biconvex lens element. The third lens unit G3 is composed of a sixth single positive meniscus lens element having a concave surface on the object side. The fourth lens unit G4 is composed of a seventh single positive meniscus lens having a convex surface on the object side. Aspherical surfaces are provided on three lens surfaces of the object side surface of the biconcave lens element disposed in the middle of the first lens unit G1 (the object side surface of the second lens element), the most object side surface of the second lens unit G2 (the object side surface of the fourth lens element), and the object side surface of the fourth lens unit G4 (the object side surface of the seventh lens element).

Figure 3:
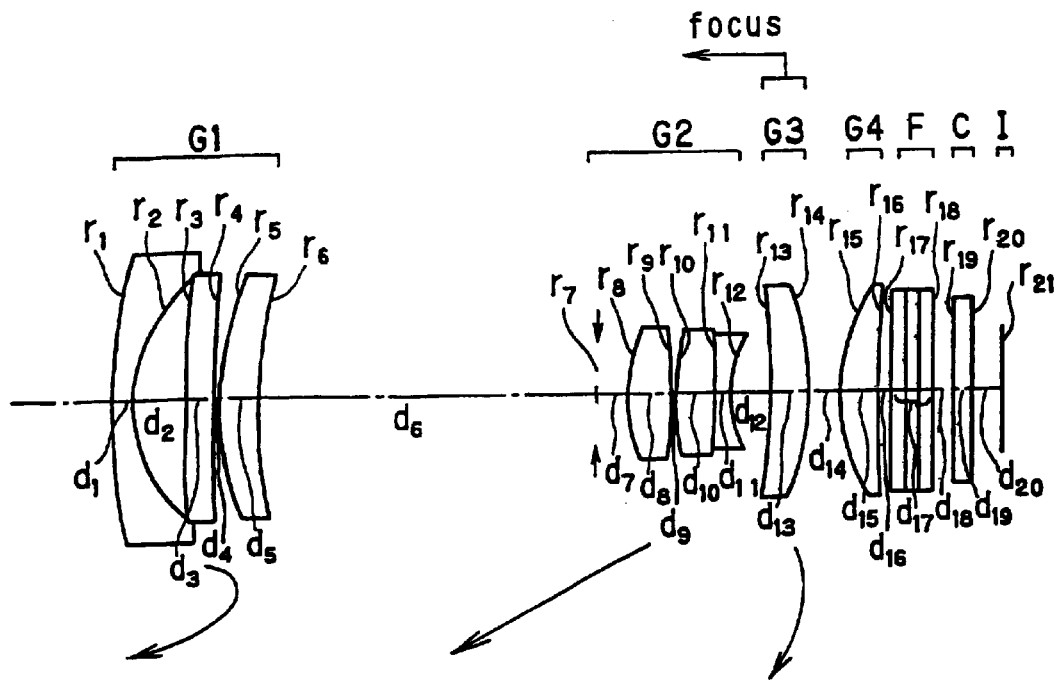
FIG. 3 is a sectional view of a third example of a zoom lens system used in this invention.

The zoom lens system of the third example according to this invention, as shown in FIG. 3, comprises a first negative lens unit G1, a second positive lens unit G2, a third positive lens unit G3, and a fourth positive lens unit G4 in this order from the object side. During zooming from the wide angle end to the telephoto end while focused on an infinite object, the first lens unit G1 moves first toward the image side, then turns toward the object side, and at the telephoto end, reaches the position closer to the object than that at the wide angle end in the direction along the optical axis. The second lens unit G2 moves toward the object side. The third lens unit G3 first moves slightly toward the image side, then turns toward the object side, and at the telephoto end, reaches the same position as in the wide angle end in the direction along the optical axis. The fourth lens unit G4 is fixed during zooming. The space between the second lens unit G2 and the third lens unit G3 increases during zooming from the wide angle end to the telephoto end. Focusing on the object in nearer range from the zoom lens system is performed by moving the third lens unit G3 toward the object side.

The first lens unit G1 is composed of a first negative meniscus lens element having a convex surface on the object side, a second biconcave lens element and a third positive meniscus lens element having a convex surface on the object side. The second lens unit G2 is composed of a fourth biconvex lens and a fifth cemented lens component consisting of a biconvex lens element and biconcave lens element, and has an aperture stop just in front of the fourth biconvex lens element. The third lens unit G3 is composed of a sixth single positive meniscus lens element having a concave surface on the object side. The fourth lens unit G4 is composed of a seventh single positive meniscus lens having a convex surface on the object side. Aspherical surfaces are provided on three lens surfaces of the object side surface of the lens element disposed in the middle of the first lens unit G1 (the object side surface of the second lens element), the most object side surface of the second lens unit G2 (the object side surface of the fourth lens element), and the object side surface of the fourth lens unit G4 (the object side surface of the seventh lens element).

Figure 4:
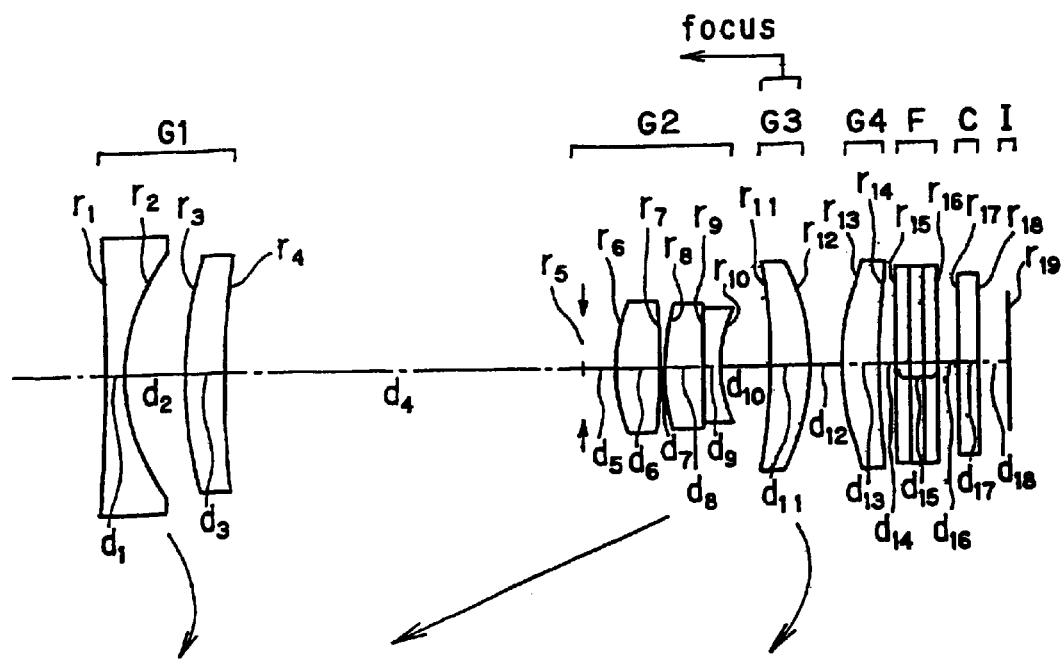
FIG. 4 is a sectional view of a fourth example of a zoom lens system used in this invention.

The zoom lens system of the fourth example according to this invention, as shown in FIG. 4, comprises a first negative lens unit G1, a second positive lens unit G2, a third positive lens unit G3, and a fourth positive lens unit G4 in this order from the object side. During zooming from the wide angle end to the telephoto end while focused on an infinite object, the first lens unit G1 moves first toward the image side, then turns toward the object side, and at the telephoto end, reaches the position closer to the image than that at the wide angle end in the direction along the optical axis. The second lens unit G2 moves toward the object side. The third lens unit G3 first moves slightly toward the image side, then turns toward the object side, and at the telephoto end, reaches the same position as in the wide angle end in the direction along the optical axis. The fourth lens unit G4 is fixed during zooming. The space between the second lens unit G2 and the third lens unit G3 increases during zooming from the wide angle end to the telephoto end. Focusing on the object in nearer range from the zoom lens system is performed by moving the third lens unit G3 toward the object side.

The first lens unit G1 is composed of a first biconcave lens element and a second positive meniscus lens element having a convex surface on the object side. The second lens unit G2 is composed of a third biconvex lens and a fourth cemented lens component consisting of a biconvex lens element and biconcave lens element, and has an aperture stop just in front of the third biconvex lens element. The third lens unit G3 is composed of a fifth single positive meniscus lens element having a concave surface on the object side. The fourth lens unit G4 is composed of a sixth single positive meniscus lens element having a convex surface on the object side. Aspherical surfaces are provided on three lens surfaces of the image side surface of the biconcave lens element in the first lens unit G1 (the image side surface of the first lens element), the most object side surface of the second lens unit G2 (the object side surface of the third lens element), and the object side surface of the fourth lens unit G4 (the object side surface of the sixth lens element).

Figure 5:
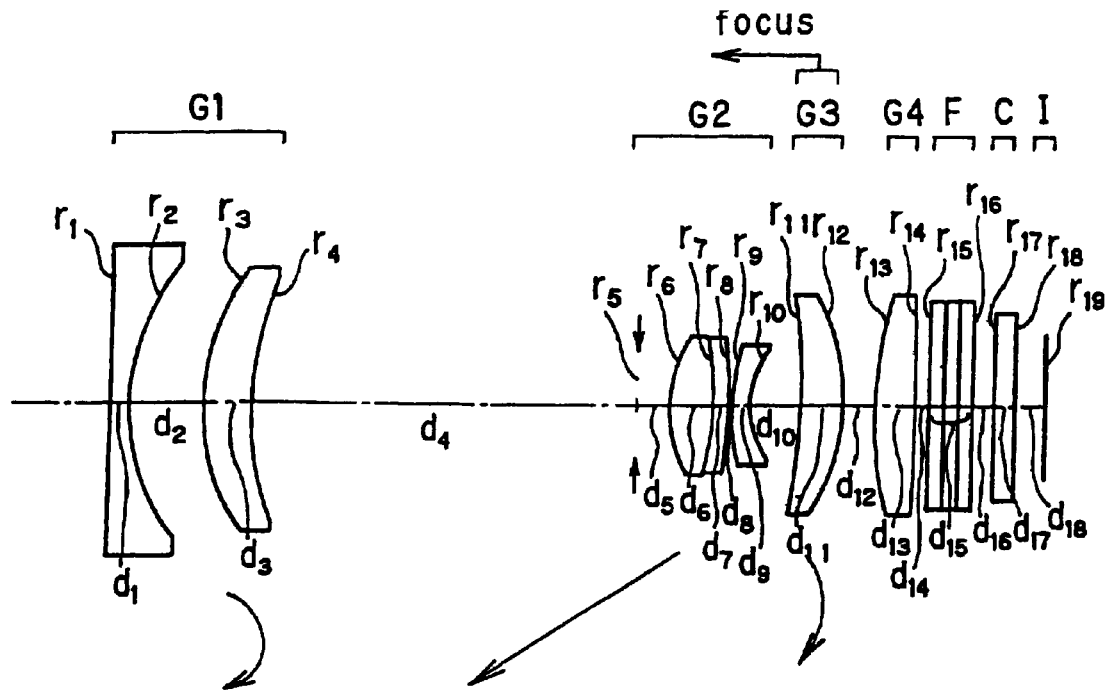
FIG. 5 is a sectional view of a fifth example of a zoom lens system used in this invention.

The zoom lens system of the fifth example according to this invention, as shown in FIG. 5, comprises a first negative lens unit G1, a second positive lens unit G2, a third positive lens unit G3, and a fourth positive lens unit G4 in this order from the object side. During zooming from the wide angle end to the telephoto end while focused on the infinite object, the first lens unit G1 moves first toward the image side, then turns toward the object side, and at the telephoto end, reaches the position slightly closer to the image than that at the wide angle end in the direction along the optical axis. The second lens unit G2 moves toward the object side. The third lens unit G3 first moves slightly toward the image side, then turns toward the object side, and at the telephoto end, reaches the same position as in the wide angle end in the direction along the optical axis. The fourth lens unit G4 is fixed during zooming. The space between the second lens unit G2 and the third lens unit G3 increases during zooming from the wide angle end to the telephoto end. Focusing on the object in the nearer range of the zoom lens system is performed by moving the third lens unit G3 toward the object side.

The first lens unit G1 of the zoom lens system of the fifth example is composed of a first negative meniscus lens element having a convex surface on the object side and a second positive meniscus lens element having a convex surface on the object side. The second lens unit G2 is composed of a third cemented lens component consisting of a biconvex lens element and a negative meniscus lens element having a concave surface on the object side and a fourth negative meniscus lens element having a convex surface on the object side, and has an aperture stop just in front of the third cemented lens component. The third lens unit G3 is composed of a fifth single positive meniscus lens element having a concave surface on the object side. The fourth lens unit G4 is composed of a sixth single positive meniscus lens element having a convex surface on the object side. Aspherical surfaces are provided on three lens surfaces of the image side surface of the negative meniscus lens element in the first lens unit G1 (the image side surface of the first lens element), the most object side surface of the second lens unit G2 (the object side surface of the third lens component), and the object side surface of the fourth lens unit G4 (the object side surface of the sixth lens element).

Figure 6:
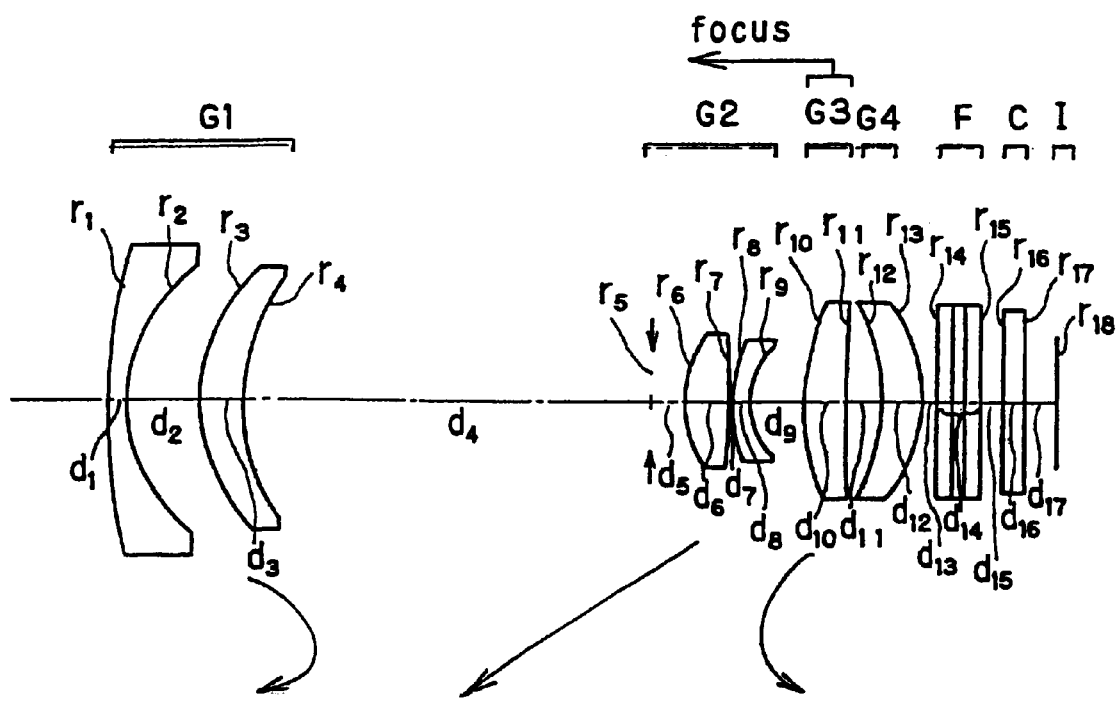
FIG. 6 is a sectional view of a sixth example of a zoom lens system used in this invention.

The zoom lens system of the sixth example according to this invention, as shown in FIG. 6, comprises a first negative lens unit G1, a second positive lens unit G2, a third positive lens unit G3, and a fourth positive lens unit G4 in this order from the object side. During zooming from the wide angle end to the telephoto end while focused on an infinite object, the first lens unit G1 moves first toward the image side, then turns toward the object side, and at the telephoto end, reaches the position slightly closer to the image than that at the wide angle end in the direction along the optical axis. The second lens unit G2 moves toward the object side. The third lens unit G3 first moves slightly toward the object side, then turns toward the image side, and at the telephoto end, reaches the position slightly closer to the object than that at the wide angle end in the direction along the optical axis. The fourth lens unit G4 is fixed during zooming. The space between the second lens unit G2 and the third lens unit G3 increases during zooming from the wide angle end to telephoto end. Focusing on the object in nearer range of the zoom lens system is performed by moving the third lens unit G3 toward the object side.

The first lens unit G1 is composed of a first negative meniscus lens element having a convex surface on the object side and a second positive meniscus lens element having a convex surface on the object side. The second lens unit G2 is composed of a third biconvex lens element and a fourth negative meniscus lens element having a convex surface on the object side, and has an aperture stop just in front of the third biconvex lens element. The third lens unit G3 is composed of a fifth single positive meniscus lens element having a convex surface on the object side. The fourth lens unit G4 is composed of a sixth single positive meniscus lens element having a concave surface on the object side. Aspherical surfaces are provided on three lens surfaces of the image side surface of the negative meniscus lens element in the first lens unit G1 (the image side surface of the first lens element), the most object side surface of the second lens unit G2 (the object side surface of the third lens component), and the image side surface of the fourth lens unit G4 (the image side surface of the sixth lens element).

The numerical data of each of above six examples are given below. In these data, f is the focal length of the entire zoom lens system, ω is the half angle of view, Fno is the F-number, FB is the back focal distance, WE is the wide angle ends ST is the intermediate state, TE is the telephoto end, r1, r2, . . . are the radiuses of curvature of each lens surfaces, d1, d2, . . . are spaces of the lens surfaces, nd1, nd2, . . . are the refractive indices for d-line of each lens elements, vd1, vd2, . . . are Abbe's numbers of each lens elements. The shape of aspherical surface is given by the following formula in which the abscissa x coincides with the optical axis, the ordinate y is perpendicular to the optical axis and the origin of the coordinates coincides with the vertex of the aspherical surface.

$$x=(y^2/r)/[1+SQRT(1(K+1)(y/r)^2)]+A4_y{}^4+A6_y{}^6+A8_y{}^8+A10_y{}^{10}$$

where r is the radius of curvature on the optical axis, K is a conic constant, and A4, A6, A8, A10 are aspherical coefficients of 4-th order, 6-th order, 8-th order, 10-th order, respectively. ASP indicates that the lens surface is an aspherical surface.

EXAMPLE 1

| r1 = 18.0970 | d1 = 0.7000 | nd1 = 1.77250 | vd1 = 49.60 |
| r2 = 5.8020 | d2 = 2.1000 | | |
| r3 = −177.9703 | d3 = 1.1000 | nd2 = 1.69350 | vd2 = 53.21 |
| Asp | | | |
| r4 = 51.8035 | d4 = 0.2000 | | |
| r5 = 10.6733 | d5 = 1.6000 | nd3 = 1.84666 | vd3 = 23.78 |
| r6 = 18.0845 | d6 = variable | | |
| r7 = ∞ (Stop) | d7 = 1.2000 | | |
| r8 = 7.2593 | d8 = 1.7000 | nd4 = 1.80610 | vd4 = 40.92 |
| Aap | | | |
| r9 = −18.3091 | d9 = 0.2000 | | |
| r10 = 15.6090 | d10 = 1.5000 | nd5 = 1.77250 | vd5 = 49.60 |
| r11 = −43.4179 | d11 = 0.6000 | nd6 = 1.84666 | vd6 = 23.78 |
| r12 = 5.1331 | d12 = variable | | |
| r13 = −41.6479 | d13 = 1.5000 | nd7 = 1.48749 | vd7 = 70.23 |
| r14 = −10.1261 | d14 = variable | | |
| r15 = 7.2826 | d15 = 1.5000 | nd8 = 1.48749 | vd8 = 70.23 |
| Asp | | | |
| r16 = 50.0000 | d16 = 0.5000 | | |
| r17 = ∞ | d17 = 1.6000 | nd9 = 1.54771 | vd9 = 62.84 |
| r18 = ∞ | d18 = 0.8000 | | |
| r19 = ∞ | d19 = 0.7500 | nd10 = 1.51633 | vd10 = 64.14 |
| r20 = ∞ | d20 = 1.2092 | | |
| r21 = ∞ | | | | aspherical coefficients the third surface (r3)

K = 0
A4 = 3.4145 × 10$^{-4}$        A6 = −1.1843 × 10$^{-5}$
A8 = 5.7153 × 10$^{-7}$         A10 = 0.0000
the eighth surface (r8)

K = 0
A4 = −6.5802 × 10$^{-4}$       A6 = 1.2613 × 10$^{-5}$
A8 = −1.8636 × 10$^{-6}$        A10 = 0.0000
the fifteenth surface (r15)

K = 0
A4 = −5.3407 × 10$^{-4}$       A6 = 2.0151 × 10$^{-5}$
A8 = −1.2730 × 10$^{-6}$        A10 = 0.0000

| | WE | ST | TE |
|---|---|---|---|
| zoom data (infinite object) | | | |
| f (mm) | 4.49823 | 8.69116 | 12.90020 |
| Fno | 2.5234 | 3.5716 | 4.5401 |
| 2ω (degree) | 58.2 | 32.1 | 22.0 |
| d6 | 13.32311 | 4.84747 | 1.50000 |
| d12 | 1.72237 | 9.30698 | 15.42999 |
| d14 | 1.20000 | 0.60000 | 1.20000 |
| zoom data (20 cm object) | | | |
| d6 | 13.32311 | 4.84747 | 1.50000 |
| d12 | 1.34032 | 7.87880 | 12.68428 |
| d14 | 1.58205 | 2.02818 | 3.94571 |

EXAMPLE 2

| r1 = 12.0547 | d1 = 0.7000 | nd1 = 1.77250 | vd1 = 49.60 |
| r2 = 5.3746 | d2 = 2.1000 | | |
| r3 = −110.7152 | d3 = 1.1000 | nd2 = 1.69350 | vd2 = 53.21 |
| Asp | | | |
| r4 = 26.5615 | d4 = 0.2000 | | |
| r5 = 7.9348 | d5 = 1.6000 | nd3 = 1.84666 | vd3 = 23.78 |
| r6 = 10.5244 | d6 = variable | | |
| r7 = ∞ (Stop) | d7 = 1.2000 | | |
| r8 = 5.9452 | d8 = 1.7000 | nd4 = 1.80610 | vd4 = 40.92 |
| Asp | | | |
| r9 = −27.4015 | d9 = 0.2000 | | |
| r10 = 12.7674 | d10 = 1.5000 | nd5 = 1.77250 | vd5 = 49.60 |
| r11 = 184.0467 | d11 = 0.6000 | nd6 = 1.84666 | vd6 = 23.78 |
| r12 = 4.0178 | d12 = variable | | |
| r13 = −70.2155 | d13 = 1.5000 | nd7 = 1.48749 | vd7 = 70.23 |
| r14 = −9.1337 | d14 = variable | | |
| r15 = 7.5302 | d15 = 1.5000 | nd8 = 1.48749 | vd8 = 70.23 |
| Asp | | | |
| r16 = 50.0000 | d16 = 0.5000 | | |
| r17 = ∞ | d17 = 1.6000 | nd9 = 1.54771 | vd9 = 62.84 |
| r18 = ∞ | d18 = 0.8000 | | |
| r19 = ∞ | d19 = 0.7500 | nd10 = 1.51633 | vd10 = 64.14 |
| r20 = ∞ | d20 = 1.2094 | | |
| r21 = ∞ | | | | aspherical coefficients the third surface (r3)

K = 0
A4 = 3.1630 × 10$^{-4}$        A6 = −1.1384 × 10$^{-5}$
A8 = 4.5936 × 10$^{-7}$         A10 = 0.0000
the eighth surface (r8)

K = 0
A4 = −8.3820 × 10$^{-4}$       A6 = 1.6127 × 10$^{-5}$
A8 = −3.4324 × 10$^{-6}$        A10 = 0.0000
the fifteenth surface (r15)

K = 0
A4 = −9.4093 × 10$^{-5}$       A6 = 2.4910 × 10$^{-5}$
A8 = −3.0519 × 10$^{-7}$        A10 = 0.0000

| | WE | ST | TE |
|---|---|---|---|
| zoom data (infinite object distance) | | | |
| f (mm) | 4.50859 | 8.68782 | 12.89685 |
| Eno | 2.5234 | 3.5716 | 4.5401 |
| 2ω (degree) | 58.0 | 32.1 | 22.0 |
| d6 | 13.23777 | 4.60124 | 1.50000 |
| d12 | 1.82131 | 3.84703 | 8.20830 |
| d14 | 1.20000 | 5.08615 | 9.20000 |

-continued zoom date (20 cm object distance)

| | | | |
|---|---|---|---|
| d6 | 13.23777 | 4.60124 | 1.50000 |
| d12 | 1.51294 | 2.95755 | 6.48645 |
| d14 | 1.50837 | 5.97563 | 10.92185 |

EXAMPLE 3

| | | | |
|---|---|---|---|
| r1 = 24.1351 | d1 = 0.7000 | nd1 = 1.77250 | vd1 = 49.60 |
| r2 = 5.9538 | d2 = 2.1000 | | |
| r3 = −147.9609 Asp | d3 = 1.1000 | nd2 = 1.52542 | vd2 = 55.78 |
| r4 = 74.8539 | d4 = 0.2000 | | |
| r5 = 11.5684 | d5 = 1.6000 | nd3 = 1.84666 | vd3 = 23.78 |
| r6 = 20.8120 | d6 = variable | | |
| r7 = ∞ (Stop) | d7 = 1.2000 | | |
| r8 = 6.3335 Asp | d8 = 1.7000 | nd4 = 1.80610 | vd4 = 40.92 |
| r9 = −20.9376 | d9 = 0.2000 | | |
| r10 = 14.9502 | d10 = 1.5000 | nd5 = 1.77250 | vd5 = 49.60 |
| r11 = −40.4131 | d11 = 0.6000 | nd6 = 1.84666 | vd6 = 23.78 |
| r12 = 4.4044 | d12 = variable | | |
| r13 = −27.9946 | d13 = 1.5000 | nd7 = 1.48749 | vd7 = 70.23 |
| r14 = −11.0236 | d14 = variable | | |
| r15 = 7.2319 Asp | d15 = 1.5000 | nd8 = 1.58913 | vd8 = 61.14 |
| r16 = 50.0000 | d16 = 0.5000 | | |
| r17 = ∞ | d17 = 1.6000 | nd9 = 1.54771 | vd9 = 62.84 |
| r18 = ∞ | d18 = 0.8000 | | |
| r19 = ∞ | d19 = 0.7500 | nd10 = 1.51633 | vd10 = 64.14 |
| r20 = ∞ | d20 = 1.2055 | | |
| r21 = ∞ | | | | aspherical coefficients the third surface (r3)

K = 0
A4 = 5.6426 × 10⁻⁴      A6 = −1.8014 × 10⁻⁵
A8 = 7.8500 × 10⁻⁷      A10 = 0.0000 the eighth (r8)

K = 0
A4 = −7.7896 × 10⁻⁴     A6 = 5.8597 × 10⁻⁶
A8 = −1.6485 × 10⁻⁶     A10 = 0.0000 the fifteenth surface (r15)

K = 0
A4 = −3.5866 × 10⁻⁴     A6 = 2.0215 × 10⁻⁵
A8 = −6.7754 × 10⁻⁷     A10 = 0.0000

| | WE | ST | TE |
|---|---|---|---|
| zoom date (infinite object distance) | | | |
| f (mm) | 4.51243 | 8.69332 | 12.89908 |
| Fno | 2.5234 | 3.5716 | 4.5401 |
| 2ω (degree) | 58.0 | 32.1 | 22.0 |
| d6 | 13.45457 | 4.75960 | 1.50000 |
| d12 | 1.62026 | 8.97143 | 15.03122 |
| d14 | 1.20000 | 0.60000 | 1.20000 |
| d6 | 13.23777 | 4.60124 | 1.50000 |
| d12 | 1.51294 | 2.95755 | 6.48645 |
| d14 | 1.50837 | 5.97563 | 10.92185 |
| zoom date (20 cm object distance) | | | |
| cd6 | 13.45457 | 4.75960 | 1.50000 |
| d12 | 1.05019 | 6.89577 | 11.11046 |
| d14 | 1.77007 | 2.67566 | 5.12076 |

EXAMPLE 4

| | | | |
|---|---|---|---|
| r1 = −90.5260 | d1 = 0.7000 | nd1 = 1.69350 | vd1 = 53.21 |
| r2 = 6.9963 Asp | d2 = 2.4000 | | |
| r3 = 15.5562 | d3 = 1.6000 | nd2 = 1.84666 | vd2 = 23.78 |
| r4 = 35.4570 | d4 = variable | | |
| r5 = ∞ (Stop) | d5 = 1.2000 | | |
| r6 = 6.8717 Asp | d6 = 1.7000 | nd3 = 1.80610 | vd3 = 40.92 |
| r7 = −32.7562 | d7 = 0.2000 | | |
| r8 = 10.9848 | d8 = 1.5000 | nd4 = 1.77250 | vd4 = 49.60 |
| r9 = −57.7545 | d9 = 0.6000 | nd5 = 1.84666 | vd5 = 23.78 |
| r10 = 4.8088 | d10 = variable | | |
| r11 = −23.4086 | d11 = 1.5000 | nd6 = 1.48749 | vd6 = 70.23 |
| r12 = −9.0966 | d12 = variable | | |
| r13 = 9.0801 Asp | d13 = 1.5000 | nd7 = 1.58913 | vd7 = 61.14 |
| r14 = 50.0000 | d14 = 0.5000 | | |
| r15 = ∞ | d15 = 1.6000 | nd8 = 1.54771 | vd8 = 62.84 |
| r16 = ∞ | d16 = 0.8000 | | |
| r17 = ∞ | d17 = 0.7500 | nd9 = 1.51633 | vd9 = 64.14 |
| r18 = ∞ | d18 = 1.2048 | | |
| r19 = ∞ | | | | aspherical coefficients the second surface (r2)

K = 0
A4 = −6.6705 × 10⁻⁴     A6 = 1.8556 × 10⁻⁵
A8 = −5.2741 × 10⁻⁷     A10 = 0.0000 the sixth surface (r6)

K = 0
A4 = −5.6147 × 10⁻⁴     A6 = 1.9560 × 10⁻⁵
A8 = −2.9306 × 10⁻⁶     A10 = 0.0000 the thirteenth surface (r13)

K = 0
A4 = −9.7948 × 10⁻⁴     A6 = 4.3215 × 10⁻⁵
A8 = −2.2531 × 10⁻⁶     A10 = 0.0000

| | WE | ST | TE |
|---|---|---|---|
| zoom data (infinite object distance) | | | |
| f (mm) | 4.52161 | 8.70287 | 12.89602 |
| Eno | 2.5234 | 3.5716 | 4.5401 |
| 2ω (degree) | 57.9 | 32.1 | 21.9 |
| d4 | 14.08487 | 4.78144 | 1.50000 |
| d10 | 2.00000 | 8.61349 | 14.24568 |
| d12 | 1.20000 | 0.60000 | 1.20000 |
| zoom data (20 cm object distance) | | | |
| d4 | 14.08487 | 4.78144 | 1.50000 |
| d10 | 1.58469 | 7.08728 | 11.33642 |
| d12 | 1.61531 | 2.12620 | 4.10926 |

EXAMPLE 5

| | | | |
|---|---|---|---|
| r1 = 1364.8623 | d1 = 0.7000 | nd1 = 1.77250 | vd1 = 49.60 |
| r2 = 7.7562 Asp | d2 = 2.7000 | | |
| r3 = 9.1332 | d3 = 1.6000 | nd2 = 1.84666 | vd2 = 23.78 |
| r4 = 12.6368 | d4 = variable | | |
| r5 = ∞ (Stop) | d5 = 1.2000 | | |
| r6 = 4.5764 Asp | d6 = 1.7000 | nd3 = 1.80610 | vd3 = 40.92 |
| r7 = −12.3191 | d7 = 0.6000 | nd4 = 1.84666 | vd4 = 23.78 |
| r8 = −29.2855 | d8 = 0.2000 | | |
| r9 = 10.1774 | d9 = 0.6000 | nd5 = 1.84666 | vd5 = 23.78 |
| r10 = 3.2791 | d10 = variable | | |
| r11 = −22.4450 | d11 = 1.5000 | nd6 = 1.48749 | vd6 = 70.23 |

-continued

| | | | |
|---|---|---|---|
| r12 = | −8.1070 | d12 = variable | |
| r13 = | 12.7877 Asp | d13 = 1.5000 | nd7 = 1.58913 vd7 = 61.14 |
| r14 = | −100.0000 | d14 = 0.5000 | |
| r15 = | ∞ | d15 = 1.6000 | nd8 = 1.54771 vd8 = 62.84 |
| r16 = | ∞ | d16 = 0.8000 | |
| r17 = | ∞ | d17 = 0.7500 | nd9 = 1.51633 vd9 = 64.14 |
| r18 = | ∞ | d18 = 1.1975 | |
| r19 = | ∞ | | | aspherical coefficients the second surface (r2)

K = 0
A4 = −3.2314 × 10⁻⁴    A6 = 8.4338 × 10⁻⁶
A8 = −2.1412 × 10⁻⁷    A10 = 0.0000 the sixth surface (r6)

K = 0
A4 = −1.2990 × 10⁻³    A6 = −7.1492 × 10⁻⁶
A8 = −5.0874 × 10⁻⁶    A10 = 0.0000 the thirteenth surface (r13)

K = 0
A4 = −5.0625 × 10⁻⁴    A6 = 1.8104 × 10⁻⁵
A8 = −8.0922 × 10⁻⁷    A10 = 0.0000

| | WE | ST | TE |
|---|---|---|---|
| zoom data (infinite object distance) | | | |
| f (mm) | 4.52690 | 8.67687 | 12.88328 |
| Fno | 2.5234 | 3.5716 | 4.5401 |
| 2ω (degree) | 57.8 | 32.1 | 22.0 |
| d4 | 14.72422 | 5.33805 | 1.50000 |
| d10 | 2.00000 | 8.54310 | 13.63534 |
| d12 | 1.20000 | 0.60000 | 1.20000 |
| zoom data (20 cm object distance) | | | |
| d4 | 14.72422 | 5.33805 | 1.50000 |
| d10 | 1.65044 | 7.24626 | 11.15552 |
| d12 | 1.54956 | 1.89684 | 3.67982 |

EXAMPLE 6

| | | | |
|---|---|---|---|
| r1 = | 22.6195 | d1 = 0.7000 | nd1 = 1.77250 vd1 = 49.60 |
| r2 = | 6.0587 Asp | d2 = 2.7000 | |
| r3 = | 6.9219 | d3 = 1.6000 | nd2 = 1.84666 vd2 = 23.78 |
| r4 = | 8.0657 | d4 = variable | |
| r5 = | ∞ (Stop) | d5 = 1.2000 | |
| r6 = | 4.0157 Asp | d6 = 1.7000 | nd3 = 1.69350 vd3 = 53.21 |
| r7 = | −70.6293 | d7 = 0.2000 | |
| r8 = | 6.1392 | d8 = 0.6000 | nd4 = 1.84666 vd4 = 23.78 |
| r9 = | 2.9613 | d9 = variable | |
| r10 = | 9.5613 | d10 = 1.5000 | nd5 = 1.48749 vd5 = 70.23 |
| r11 = | 102.2252 | d11 = variable | |
| r12 = | −8.1352 | d12 = 1.5000 | nd6 = 1.58913 vd6 = 61.14 |
| r13 = | −5.2208 Asp | d13 = 0.5000 | |
| r14 = | ∞ | d14 = 1.6000 | nd7 = 1.54771 vd7 = 62.84 |
| r15 = | ∞ | d15 = 0.8000 | |
| r16 = | ∞ | d16 = 0.7500 | nd8 = 1.51633 vd8 = 64.14 |
| r17 = | ∞ | d17 = 1.2088 | |
| r18 = | ∞ | | |

-continued aspherical coefficients the second surface (r2)

K = 0
A4 = −2.1576 × 10⁻⁴    A6 = 8.8126 × 10⁻⁶
A8 = −4.3302 × 10⁻⁷    A10 = 0.0000 the sixth surface (r6)

K = 0
A4 = −1.5957 × 10⁻³    A6 = 2.2500 × 10⁻⁵
A8 = −1.4500 × 10⁻⁵    A10 = 0.0000 the thirteenth surface (r13)

K = 0
A4 = 1.7620 × 10⁻³    A6 = −4.1021 × 10⁻⁵
A8 = 2.0115 × 10⁻⁶    A10 = 0.0000

| | WE | ST | TE |
|---|---|---|---|
| zoom data (infinite object distance) | | | |
| f (mm) | 4.59300 | 8.65611 | 12.88288 |
| Fno | 2.7298 | 3.3922 | 4.5086 |
| 2ω (degree) | 57.1 | 32.2 | 22.0 |
| d4 | 15.32489 | 3.88201 | 1.50000 |
| d9 | 2.00000 | 3.50000 | 11.75031 |
| d11 | 1.20000 | 3.15313 | 1.72785 |
| zoom data (20 cm object distance) | | | |
| d4 | 15.32489 | 3.88201 | 1.50000 |
| d9 | 1.77271 | 2.81389 | 10.15331 |
| d11 | 1.42729 | 3.83924 | 3.32485 |
| zoom data (20 cm object) | | | |
| d6 | 13.32311 | 4.84747 | 1.50000 |
| d12 | 1.34032 | 7.87880 | 12.68428 |
| d14 | 1.58205 | 2.02818 | 3.94571 |

Figure 7:
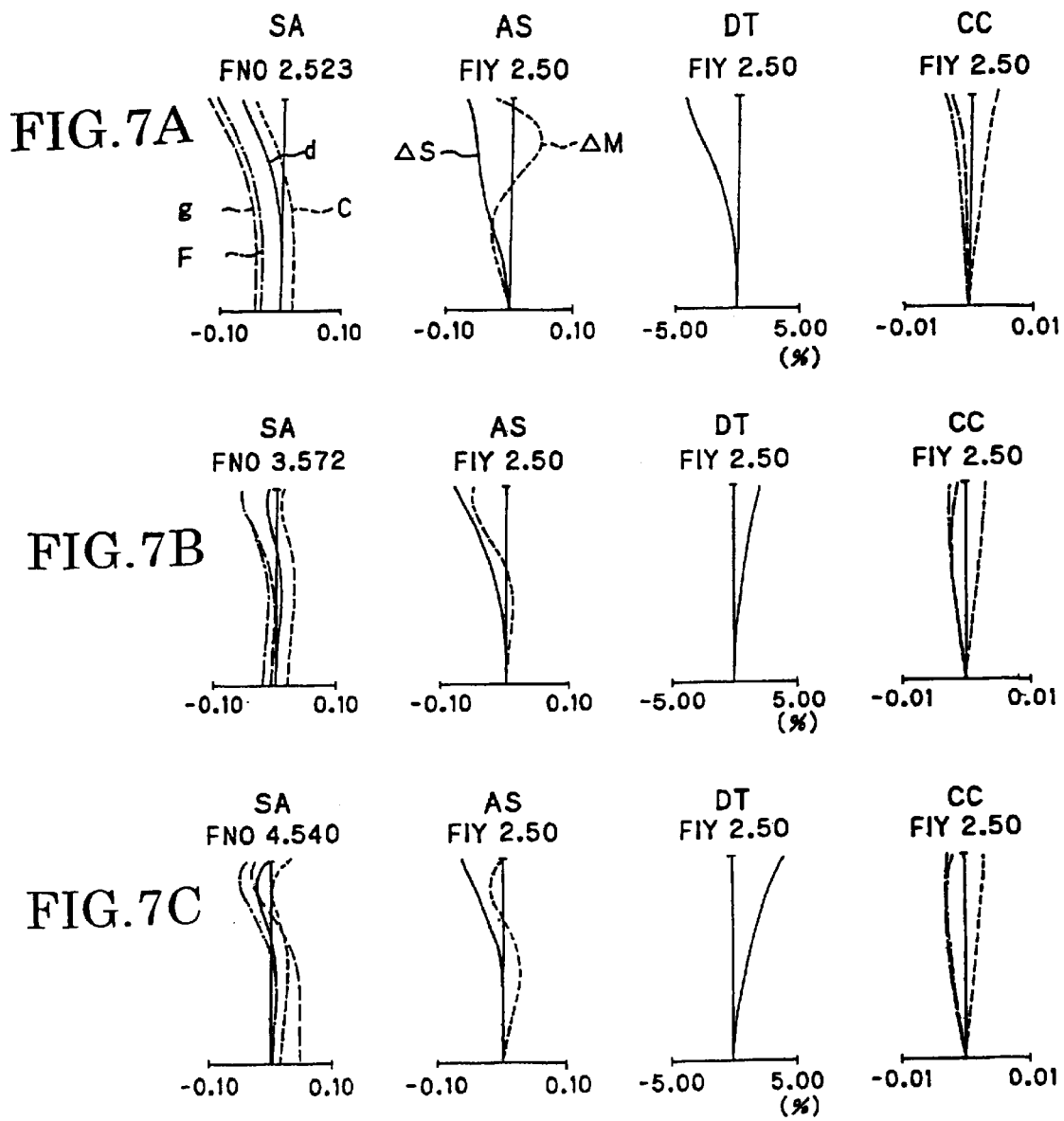
FIGS. 7A, 7B and 7C are graphs of aberrations of the first example when focused on an infinite object in a wide angle end, an intermediate state and a telephoto end, respectively.

FIGS. 7A, 7B and 7C are graphs of aberrations of the zoom lens system of the first example when the zoom lens system is focused on the infinite object. In the figure, SA represents the spherical aberration, AS the astigmatism, DT the distortion, CC the chromatic aberration of magnification. FIG. 7A is a graph of aberrations in the wide angle end, FIG. 7B is in an intermediate state, and FIG. 7C is in the telephoto end. FIY means image height.

The table 1 shown below is a list of the value of parameters in the conditions (1) through (10), (a), and (b).

TABLE 1

| Conditions | Examples | | | | | |
|---|---|---|---|---|---|---|
| | 1 | 2 | 3 | 4 | 5 | 6 |
| (1) | 2.7415 | 2.8774 | 2.6822 | 2.4491 | 2.3271 | 2.0556 |
| (2) | −0.9390 | −0.5387 | −1.0063 | −0.6977 | −0.6733 | −0.4677 |
| (3) | −0.5975 | −1.1000 | −0.5724 | −0.8040 | — | — |
| (4) | 0.1500 | 0.1500 | 0.1500 | 0.1500 | — | — |
| (5) | 0.1500 | 0.1500 | 0.1500 | 0.1500 | 0.1935 | 0.2400 |
| (6) | 1.1400 | 1.1400 | 1.1400 | 0.9400 | 1.0000 | 1.0000 |
| (Y:mm) | (Y = 5.0) | (Y = 5.0) | (Y = 5.0) | (Y = 5.0) | (Y = 5.0) | (Y = 5.0) |
| (7) | 0.8000 | 0.8000 | 0.8000 | 0.8000 | 0.6200 | 0.5000 |
| (Y:mm) | (Y = 5.0) | (Y = 5.0) | (Y = 5.0) | (Y = 5.0) | (Y = 5.0) | (Y = 5.0) |
| (8) | 0.80752 | 0.80756 | 0.80678 | 0.80664 | 0.80518 | 0.80744 |
| (9) | 0.24 | 0.24 | 0.24 | 0.24 | 0.24 | 0.24 |
| (10) × $10^{-3}$ | 0.333 | 0.333 | 0.333 | 0.333 | 0.333 | 0.333 |
| (a:μm) | (a = 3.0) | (a = 3.0) | (a = 3.0) | (a = 3.0) | (a = 3.0) | (a = 3.0) |
| (a) | 1.2728 | 1.4759 | 1.3736 | 1.2400 | 1.1248 | 0.9555 |
| (b) | 2.5660 | 2.5299 | 2.5530 | 2.5036 | 2.5047 | 2.3990 |

In each example, an OLPF F having a near-infrared light blocking thin film on its entrance surface is placed on the image side of the fourth lens unit G4. This near-infrared light blocking thin film has spectral transmittance of more than 80% at a wavelength of 600 nm and less than 10% at 700 nm. It is a multi-layer thin film composed of 27 layers shown below. The standard wavelength λ used for designing is 780 nm.

| number of layer | Material | Physical thickness (nm) | ratio to λ/4 |
|---|---|---|---|
| substrate | Quartz | — | — |
| first layer | $Al_2O_3$ | 58.96 | 0.50 |
| second layer | $TiO_2$ | 84.19 | 1.00 |
| third layer | $SiO_2$ | 134.14 | 1.00 |
| fourth layer | $TiO_2$ | 84.19 | 1.00 |
| fifth layer | $SiO_2$ | 134.14 | 1.00 |
| sixth layer | $TiO_2$ | 84.19 | 1.00 |
| seventh layer | $SiO_2$ | 134.14 | 1.00 |
| eighth layer | $TiO_2$ | 84.19 | 1.00 |
| ninth layer | $SiO_2$ | 134.14 | 1.00 |
| tenth layer | $TiO_2$ | 84.19 | 1.00 |
| eleventh layer | $SiO_2$ | 134.14 | 1.00 |
| twelfth layer | $TiO_2$ | 84.19 | 1.00 |
| thirteenth layer | $SiO_2$ | 134.14 | 1.00 |
| fourteenth layer | $TiO_2$ | 84.19 | 1.00 |
| fifteenth layer | $SiO_2$ | 178.41 | 1.33 |
| sixteenth layer | $TiO_2$ | 101.03 | 1.21 |
| seventeenth layer | $SiO_2$ | 167.67 | 1.25 |
| eighteenth layer | $TiO_2$ | 96.82 | 1.15 |
| nineteenth layer | $SiO_2$ | 147.55 | 1.05 |
| twentieth layer | $TiO_2$ | 84.19 | 1.00 |
| twenty-first layer | $SiO_2$ | 160.97 | 1.20 |
| twenty-second layer | $TiO_2$ | 84.19 | 1.00 |
| twenty-third layer | $SiO_2$ | 154.26 | 1.15 |
| twenty-fourth layer | $TiO_2$ | 95.13 | 1.13 |
| twenty-fifth layer | $SiO_2$ | 160.97 | 1.20 |
| twenty-sixth layer | $TiO_2$ | 99.34 | 1.18 |
| twenty-seventh layer | $SiO_2$ | 87.19 | 0.65 |
| air | — | — | — |

Figure 8:
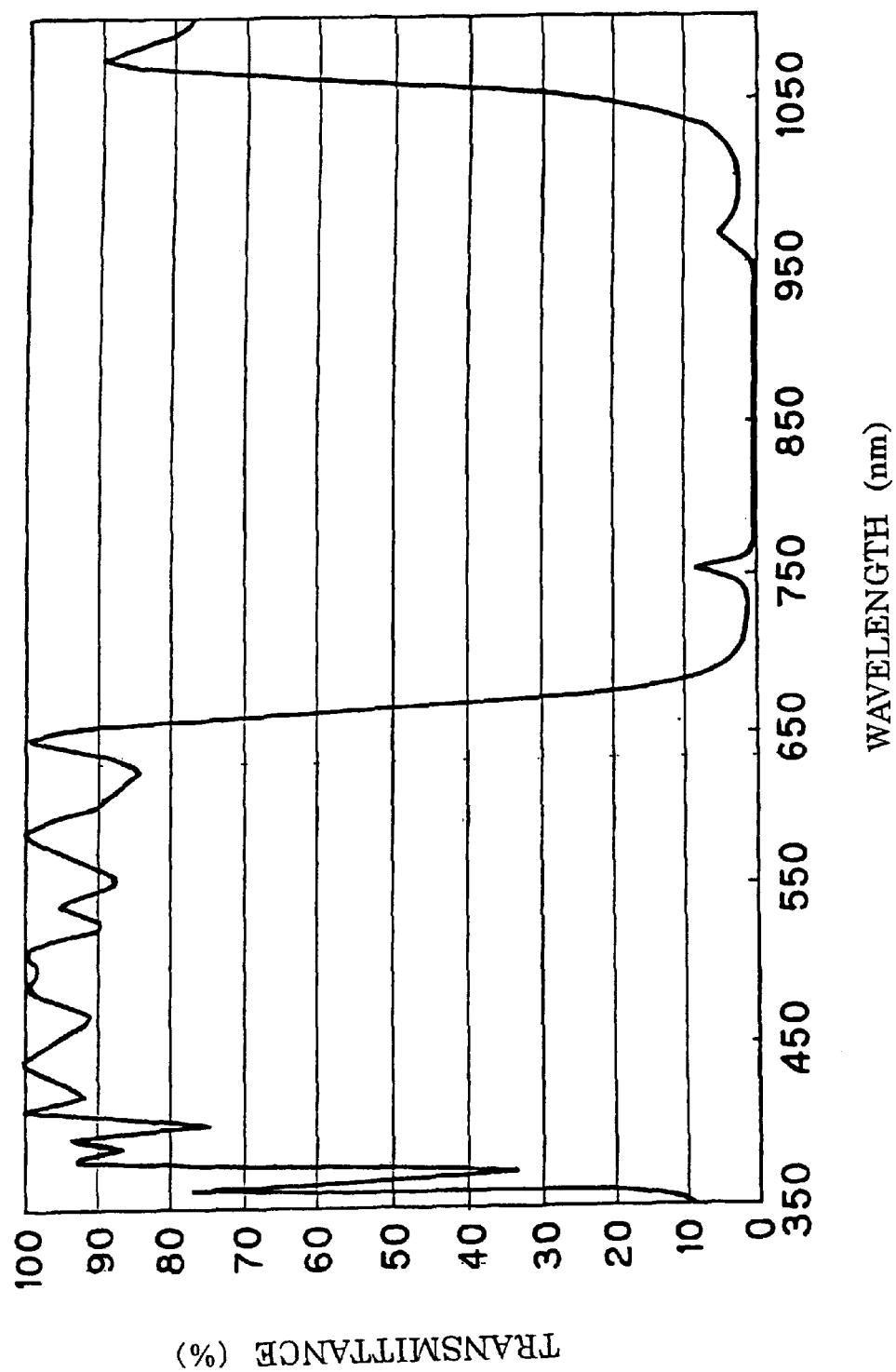
FIG. 8 shows an example of spectral transmittance of an infrared blocking thin film.

The spectral transmittance of the near-infrared blocking thin film is shown in FIG. 8.

Figure 9:
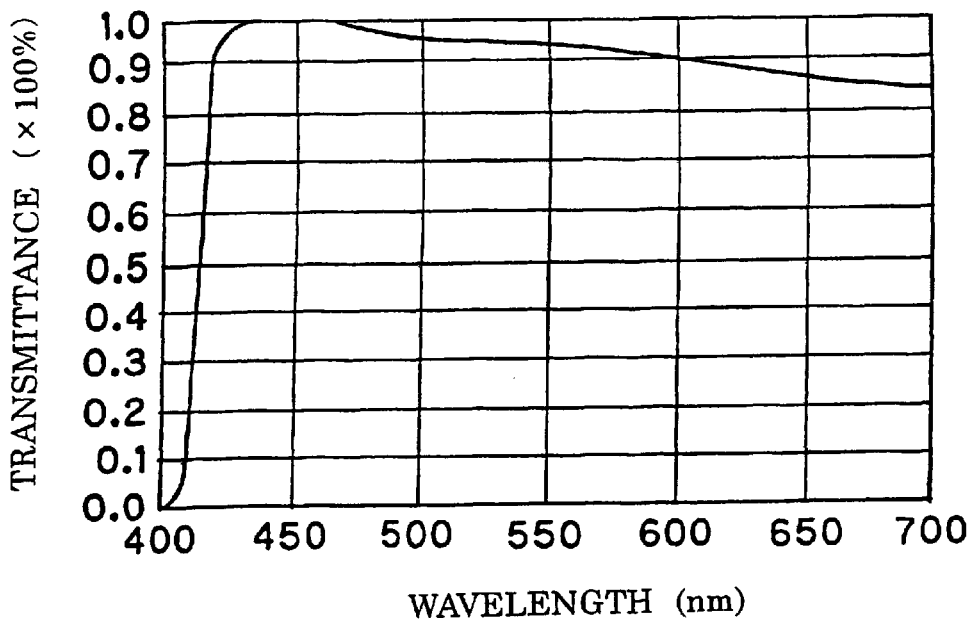
FIG. 9 shows an example of spectral transmittance of a color control filter provided on the exit surface of an optical low pass filter.

A color control thin film which decreases the spectral transmittance in short wavelength region shown in FIG. 9 is coated on the exit surface of the OLPF for improving color reproduction of the electronic image. A filter having the same property also can be used for the same purpose. It is desirable that this thin film or filter has transmittance of more than 15% at 420 nm and less than 6% at 400 nm of the maximum transmittance between 400 nm and 700 nm. This reduces difference between the color recognition of the human eye and the color of the image that is taken by the electronic picture taking apparatus and reproduced by the electronic observation system. That is, this color control filter eliminates the short wavelength color component that is less easily detected by the human eye but sensitively detected by image pickup devices. This prevents the short wavelength color component from prominently appearing in the electronic image. Therefore, the quality of electronic image can be improved.

When the transmittance at 400 nm exceeds 6% of the highest transmittance between 400 nm and 700 nm, the short wavelength color light component less sensible for human eye appears in the electronic image and is observable by human eye. On the contrary, when the transmittance at 420 nm comes below 15% of the maximum transmittance between 400 nm and 700 nm, the color light component sensible by the human eye is poorly reproduced in the electronic image and the color balance of the image deteriorates. This kind of measure for color control is particularly effective for an electronic picture taking apparatus employed with an image pickup device having complementary color filter array.

In each example, as shown in FIG. 9, thin film is used with a transmittance of 0% at 400 nm, 90% at 420 nm and nearly 100% (maximum transmittance) at 440 nm. By combining this color control thin film and aforementioned near-infrared light blocking thin film, the entire imaging optical system has spectral transmittance of 0% at 400 nm, 80% at 420 nm, 99% (maximum transmittance) at 450 nm, 82% at 600 nm and 2% at 700 nm. This accomplishes high fidelity color reproduction.

The OLPF F is composed three individual filters each of which is made of monocrystal plates stacked along the optical axis. One filter has its crystal axis laid along the horizontal scanning direction (0 degree) when it is projected on the image plane. The other two filters have crystal axes laid in ±45 degrees from the horizontal scanning direction when they are projected on the image plane. The separations between ordinary ray and extraordinary ray given by these filters on the image plane are a μm in the horizontal scanning direction and SQRT(½)×a μm in ±45 degree direction. This is effective to suppress moiré. Here, SQRT means square root and a is the pitch of pixels of the image pickup device.

Figure 10:
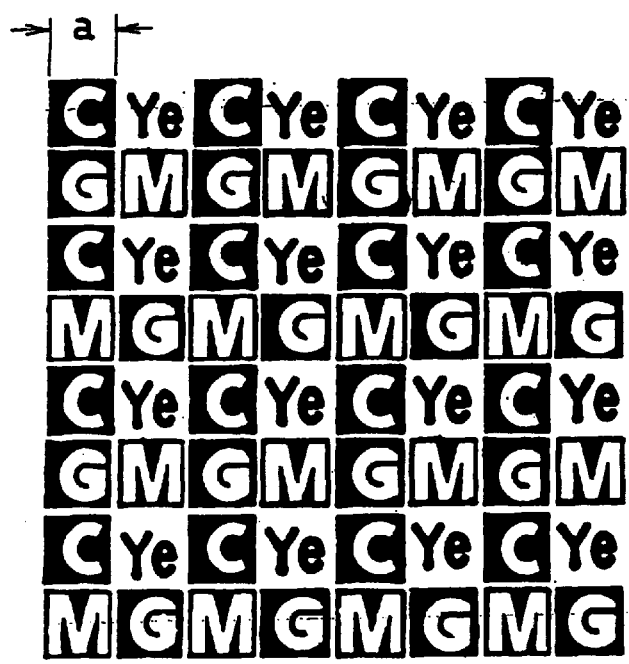
FIG. 10 shows an example of layout of filter elements of a complementary color filter array.

On the image receiving surface of the image pickup device, as shown in FIG. 10, four kinds of color filter elements of cyan C, magenta M, yellow Ye and green G are provided corresponding to each pixel element of the image pickup device. These filter elements form a complementary color encoding mosaic filter. Each of the color filter elements is almost the same in number and is arranged in a manner that the same color elements are not adjacent to each other. This brings high fidelity in color reproduction.

The green filter G has a peak of transmittance at wavelength GP, the yellow filter Ye has a peak of transmittance at wavelength YP, the cyan filter C has a peak of transmittance at wavelength CP, and the magenta filter M has peaks of transmittance at wavelength MP1 and MP2. These filters satisfy the following conditions:

$$510 \text{ nm} < GP < 540 \text{ nm}$$

$$5 \text{ nm} < YP - GP < 35 \text{ nm}$$

$$-100 \text{ nm} < CP - GP < -5 \text{ nm}$$

$$430 \text{ nm} < MP1 < 480 \text{ nm}$$

$$580 \text{ nm} < MP2 < 640 \text{ nm}$$

Further, the green G, yellow Ye and cyan C filters have transmittance at 530 nm more than 80% as large as that of at the peak. The magenta filter has transmittance at 530 nm between 10% and 50% as large as that of at larger peak. This is preferable to improve the fidelity of color reproduction.

Figure 11:
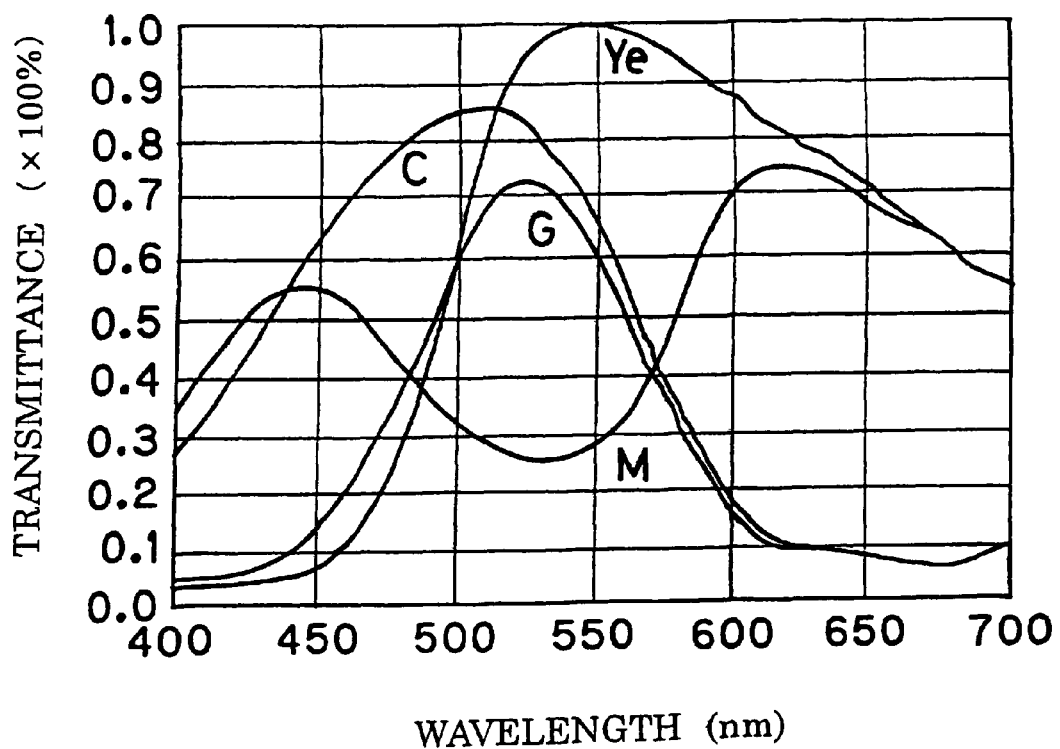
FIG. 11 shows an example of spectral transmittance of the filter elements of the complementary color filter array.

Specific spectral transmittances of the color filters are shown in FIG. 11. The green filter G has peak transmittance at 525 nm. Yellow filter Ye has peak transmittance at 555 nm. Cyan filter C has peak transmittance at 510 nm. Magenta filter M has peak transmittances at 445 nm and 620 nm. Transmittances of these four color filters at 530 nm are 99% in green, 95% in yellow, 97% in cyan, and 38% in magenta.

In an electronic picture taking apparatus such as a digital camera using this type of complementary color mosaic filter, the electric output from the image pickup device is processed by a signal controller equipped in the digital camera or prepared independently with the digital camera. Illuminance signal Y and color difference signals R–Y, B–Y are produced according to the following formulae:

$$Y = |G + M + Ye + C| \times \tfrac{1}{4}$$

$$R - Y = |(M + Ye) - (G + C)|$$

$$B - Y = |(M + C) - (G + Ye)|$$

From these signals, primary color signals red R, green G and blue B are generated.

The near-infrared blocking thin film can be placed anywhere on the optical axis in the picture taking optical system. The OLPF F can be composed of one or two individual filters.

Figure 12:
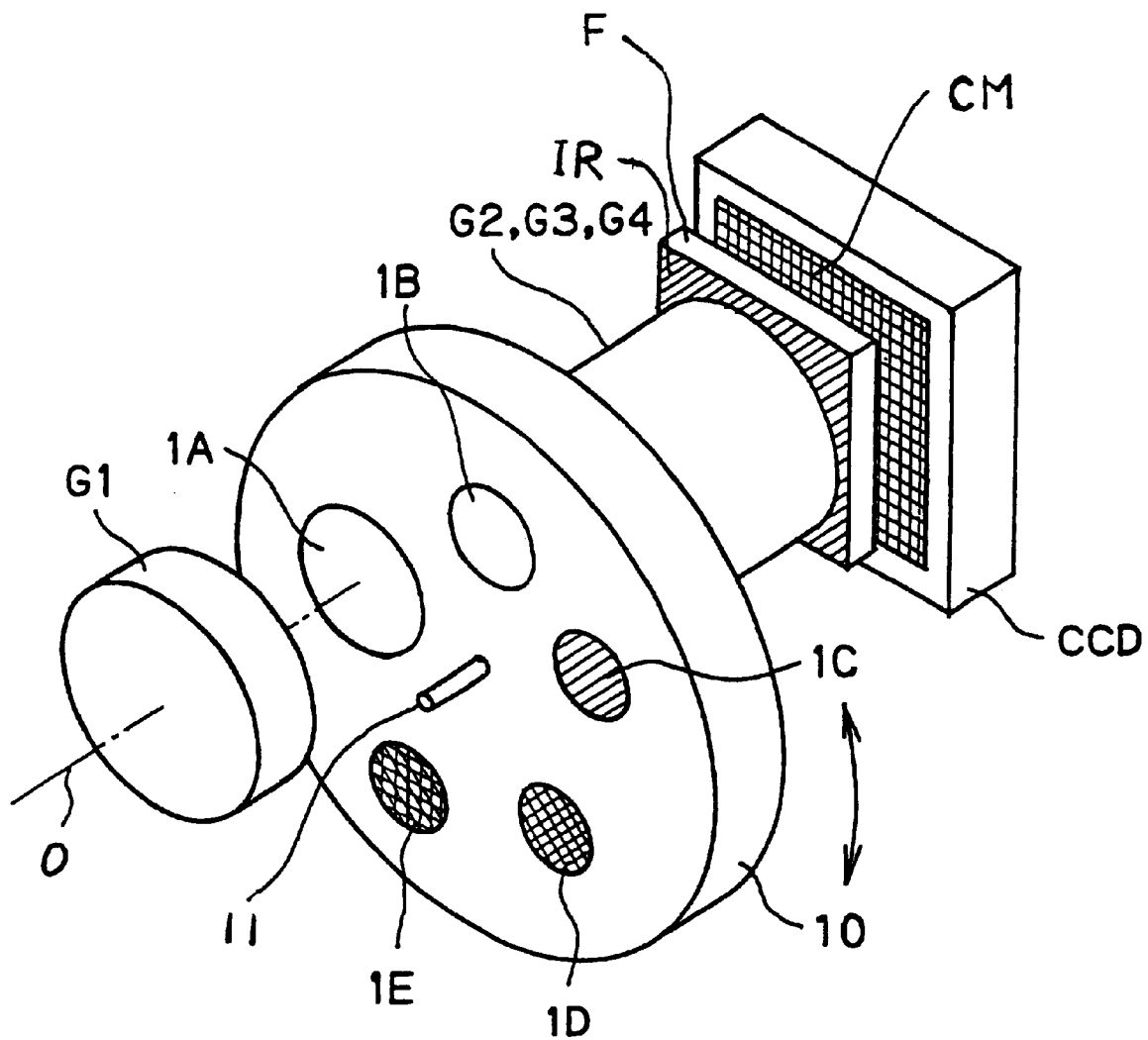
FIG. 12 is a detailed oblique view of an example of an aperture stop.

FIG. 12 is a schematic view of an example of the optical system of the electronic picture taking apparatus according to this invention. In the figure, O is an optical axis, G1 through G4 are the first through fourth lens unit, respectively. F is an OLPF having near-infrared light blocking thin film IR, CM is a complementary color encoding mosaic filter, and CCD is a CCD image pickup device. The cover glass of the CCD image pickup device is omitted in this figure. Between the first lens unit G1 and second lens unit G2, an aperture stop composed of a turret 10 having five openings for zero step 1A, –1 step 1B, –2 step 1C, –3 step 1D and –4 step 1E. The opening 1A has a circular shape of diameter 4 mm and transmittance 100% at 550 nm. The opening 1B is approximately half as large as the opening 1A and provided with a transparent plate having transmittance 99% at 550 nm. The openings 1C, 1D and 1E are as large as the opening 1A and provided with neutral density filters of transmittance 50%, 25% and 10%, respectively. By rotating the turret around the rotation axis 11, one of the openings is alternatively placed on the optical axis and the amount of light reaching the image pickup device is adjusted.

In this example, when light amount is adjusted from zero step to –1 step, or the opening is replaced from 1A to 1B, the size of the opening is changed. However, when the light amount is adjusted from –1 step to –2, –3, or –4 step, the size of the opening is kept constant and the transmittance of the opening is changed. Namely, the change of the size and change of the transmittance of the opening are combined to adjust the light amount. Moreover, when a light amount adjustment is performed such that effective F-number Fno' is smaller than a/0.4 (mm), the opening equipped with a neutral density filter whose transmittance is less than 80% at 550 nm is placed in the optical path. In the example 1, a=3.0 and the relationship Fno'>a/0.4=7.5 is satisfied, for example, when the light amount is adjusted to –2 step at the telephoto end of the zoom lens where the effective F-number Fno' becomes 9.0. In this adjustment, the turret rotates to insert the opening C into the optical path. The size of opening 1C is same as that of opening 1B, therefore, the light amount can be decreased with no degradation of image quality caused by diffraction.

Figure 13:
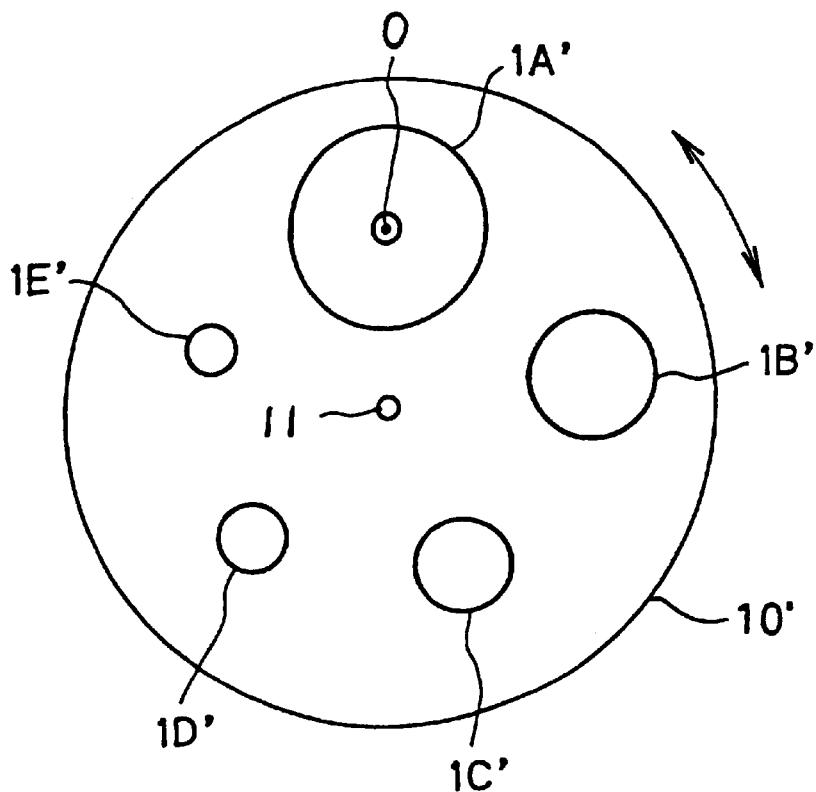
FIG. 13 is a detailed plane view of another example of the aperture stop.
Figure 14:
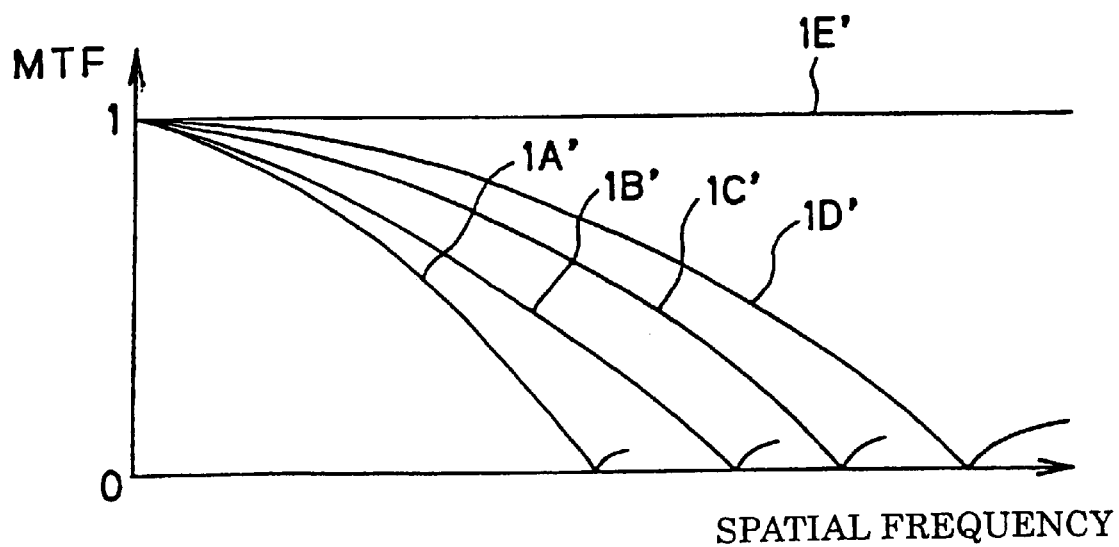
FIG. 14 is a graph of spatial frequency response curves of the optical low-pass filters used in the example shown in FIG. 13.

FIG. 13 and 14 show another example of aperture stop replaceable with the aperture stop in FIG. 12. In FIG. 13, turret 10' has five openings 1A' through 1E' whose sizes are different but transmittances are substantially the same. The opening of zero step 1A' has a circular shape of 4 mm diameter. The opening of –1 step 1B' is approximately half as large as opening 1A. The opening of the –2, –3, and –4 steps become smaller in turn. This plurality of openings is equipped with OLPFs whose spatial frequency responses are different. FIG. 14 is a graph of MTFs (modulation transfer functions) of these OLPFs. The reference symbols 1A' through 1E' mean that the graph represents the MTF of the OLPF provided in the opening designated same reference symbols. Apparent from FIG. 14, the smaller the size of opening is, the larger the MTF of the OLPF filter is. The entire frequency response of the image pickup optical system, including the influence of diffraction by aperture stop and frequency response of the OLPFs, is maintained substantially constant even if one opening of the aperture stop and OLPF inserted in the optical path is changed to another. Therefore, by rotating the turret around the rotation axis, light amount adjustment is performed without degradation of image quality caused by diffraction.

The electronic picture taking apparatus disclosed may be applied to picture taking apparatuses with a zoom lens for forming image of an object and an image pickup device such as CCD image sensor for receiving the image, particularly digital cameras, video cameras, personal computers, cellular phones, and the like. Some examples of these apparatuses are described below.

Figure 15:
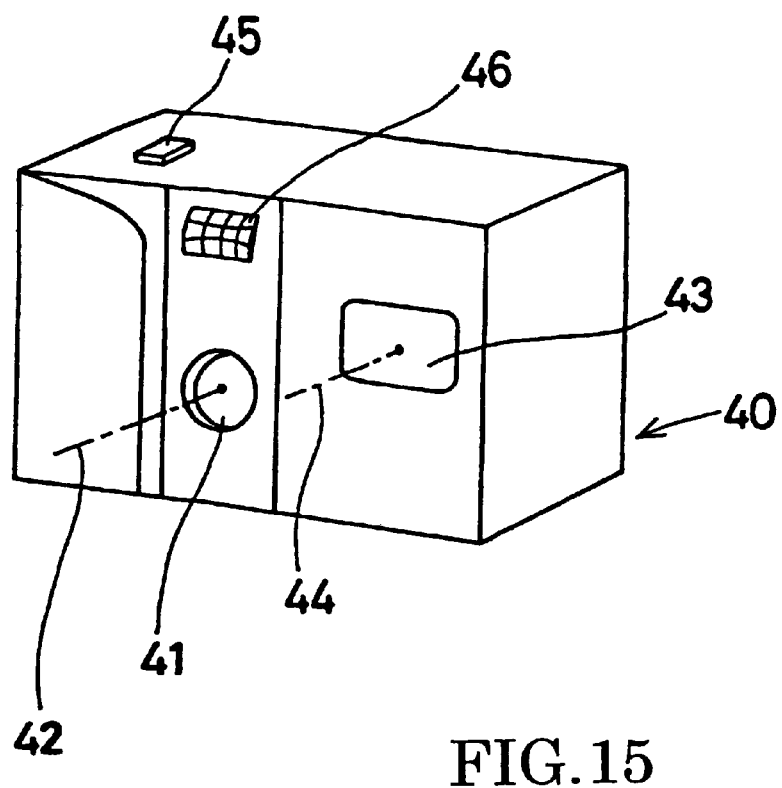
FIG. 15 is a front oblique view of a digital camera as an example of an electronic picture taking apparatus including a zoom lens system according to this invention.
Figure 16:
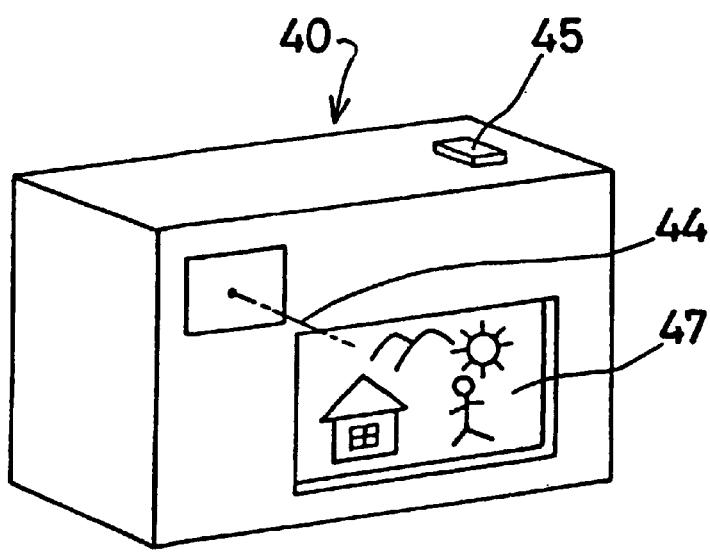
FIG. 16 is a back oblique view of the electronic picture taking apparatus shown in FIG. 15.
Figure 17:
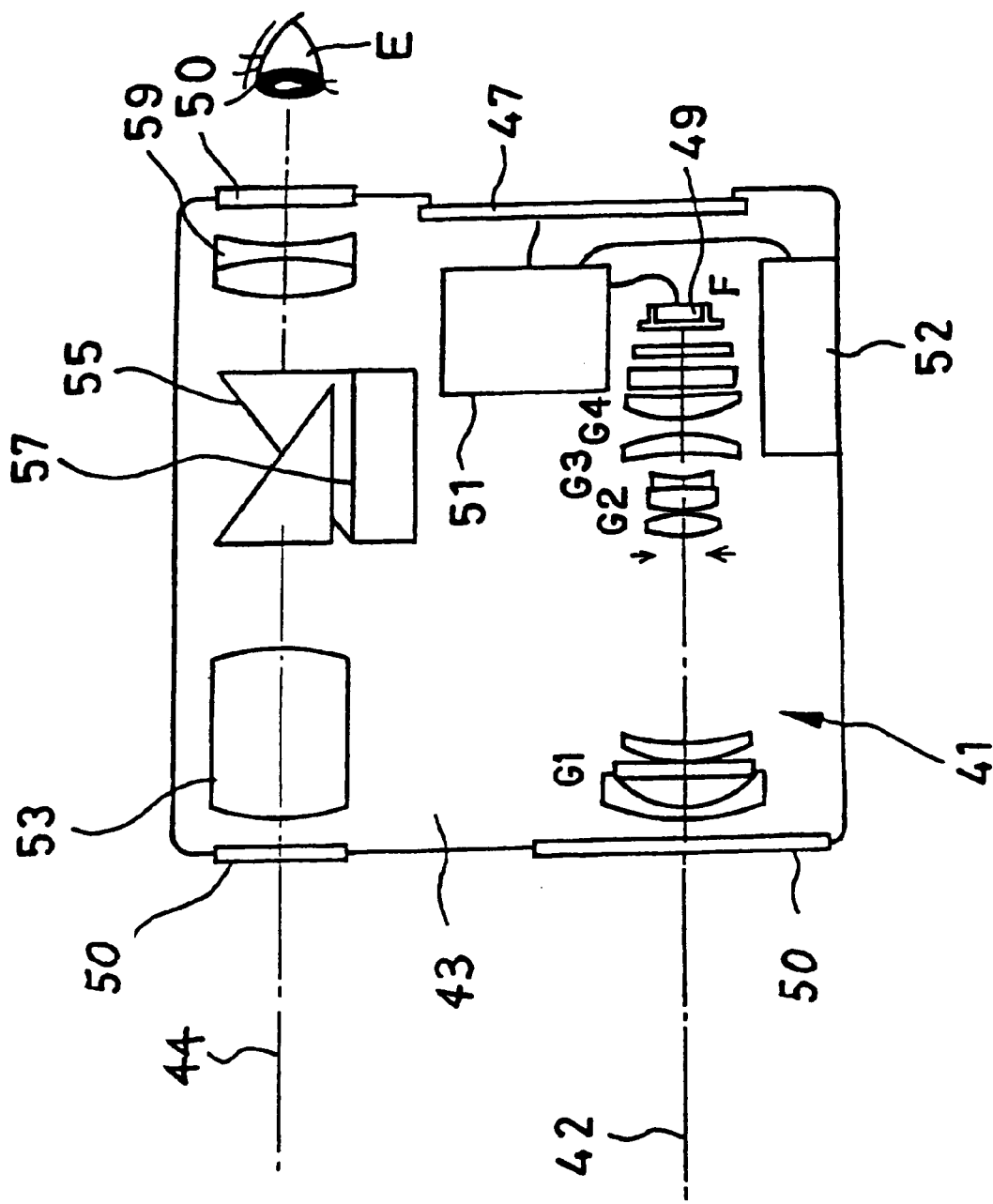
FIG. 17 is a sectional view of the electronic picture taking apparatus shown in FIG. 15.

FIGS. 15 through 17 are schematic views of a digital camera. FIG. 15 is a front oblique view of the digital camera 40, FIG. 16 is a back oblique view of the digital camera 40, and FIG. 17 is a sectional view of the digital camera 40.

The digital camera 40 comprises a picture taking optical system having a picture taking optical path 41, finder optical system 43 having a finder optical path 44, shutter button 45, electric flash 46, liquid crystal display monitor 47. By pressing the shutter button 45 arranged on the top of the camera 40, a picture of an object is taken through the picture taking optical system 41 such as zoom lens system of the first example described above. The image is formed on the image receiving surface of the CCD image sensor 49 through the OLPF F having a near-infrared light blocking thin film by the picture taking optical system 41. The image received by the CCD image sensor 49 is displayed on the liquid crystal display monitor 47 mounted on the backside of the camera through the signal processing means 51. The image can be recorded in the recording means 52 connected to the signal processing means 51. The recording means 52 may be detachably constructed from the processing means 51, and may be magnetically, electrically or optically recorded on media such as a floppy disc, memory card, magneto-optical disc, or the like.

Further, objective lens 53 of the finder optical system is located on the finder optical path 44. An image of an object is formed on the field mask 57 installed in Porro-prism system 55 as an image erecting member. An eyepiece optical system 59 is located on the rear side of Porro-prism system 55 to lead the erected image to the observer's eye E. Cover members 50 are provided on the entrance side of the picture taking optical system 41 and the objective lens system 53 of the finder optical system, and on the exit side of the eyepiece optical system 59. Both a plane parallel plate and a lens having optical power may be used as the cover member 50.

The above described digital camera 40 has a zoom lens as a picture taking optical system 40 which has wide angle of view, high zooming ratio, highly corrected aberrations, large aperture, and long back focal distance allowing to dispose filters. Therefore, excellent imaging performance and reduction of cost can be realized.

Figure 18:
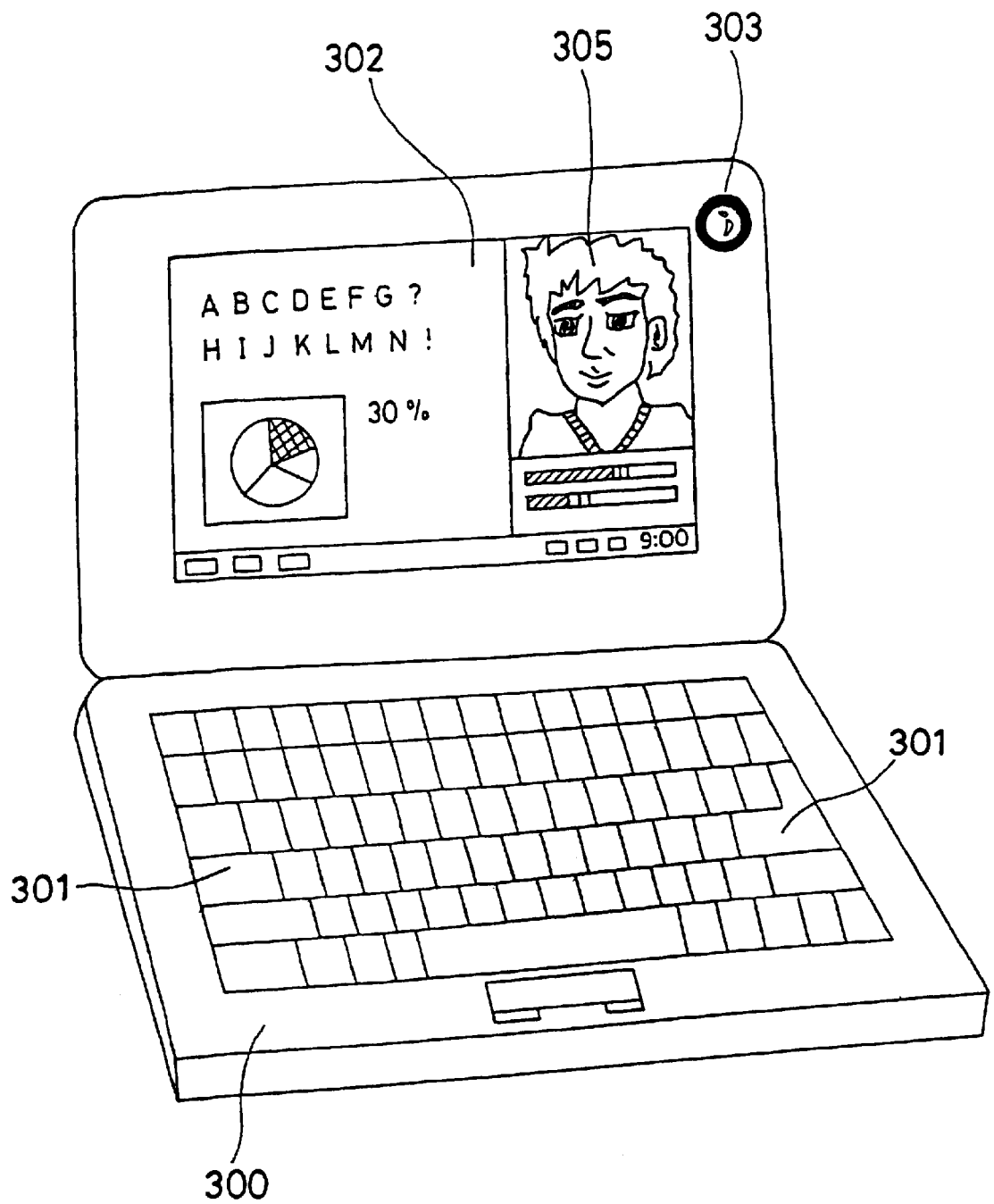
FIG. 18 is a front oblique view of a personal computer in which the cover is opened as an example of an electronic picture taking apparatus including a zoom lens system according to this invention.
Figure 19:
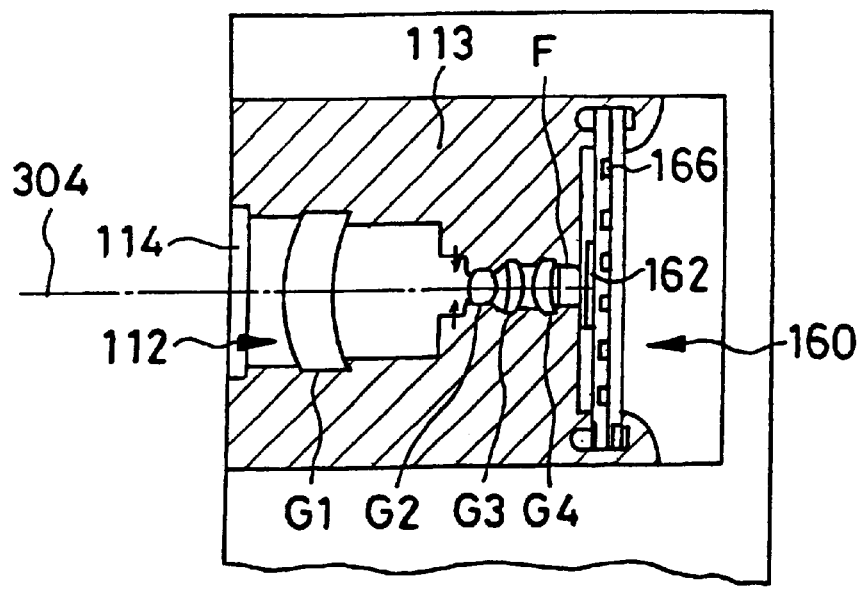
FIG. 19 is a sectional view of a picture taking optical system of the personal computer shown in FIG. 18.
Figure 20:
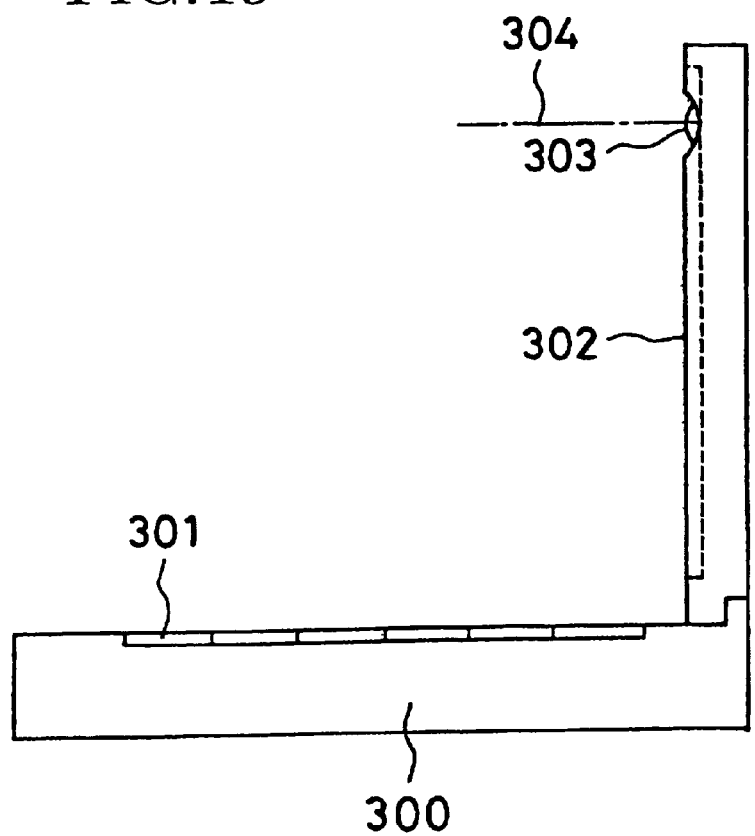
FIG. 20 is a side view of the personal computer shown in FIG. 18.

Next, a personal computer as an example of the information processing apparatus including zoom lens system as objective lens is shown in FIGS. 18 through 20. FIG. 18 is a front oblique view of the personal computer 300 when the cover is opened. FIG. 19 is a sectional view of the picture taking optical system 303 of the personal computer 300. FIG. 20 is a side view of the personal computer shown in FIG. 18.

As shown in FIGS. 18 through 20, the personal computer 300 has a keyboard for inputting information by the user, information processing means and recording means (not shown), a monitor 302 for displaying information to the user, and a picture taking optical system 303 for taking a picture of the user itself or neighborhood. The monitor 302 may be composed by a transmission type liquid crystal display device illuminated from the back side by illumination light emanating from a back light source(not shown), a reflection type liquid crystal display device reflecting the light entering from the front side, a cathode ray tube, or the like. The picture taking optical system is not limited to be placed at the top right-hand side of the monitor, and may be placed anywhere around the monitor 302 and keyboard 301.

The picture taking optical system 303 has a zoom lens 112 (shown in simplified form in the figure) according to this invention and an image pickup device chip 162 on the picture taking optical path. These constituent elements are contained in the personal computer 300.

The OLPF F is incorporated in the image pickup device chip 162 by adhesive to form an image pickup unit 160. The image pickup unit 160 is mountable on the rear end of the lens barrel 113 of the objective lens 112 by inserting the image pickup unit 160 into it. Therefore, adjustment for alignment of objective lens 112 and image pickup device chip 162 or space between these two parts is unnecessary and assembly of the electronic picture taking apparatus is simplified. At the front end of the lens barrel 113, a cover glass 114 is attached to protect the objective lens 112. The zooming mechanism in the lens barrel 113 is omitted in the figure.

The object image focused on the image pickup device chip 162 is supplied to the processing means through the terminal 166, and displayed on the monitor 302 as an electric image. In FIG. 18, an image of the user himself 305 appears on the monitor screen as an example. The image 305 can be displayed on other personal computers through the processing means and on the Internet or a telephone from long-distance.

Figures 21, 22:
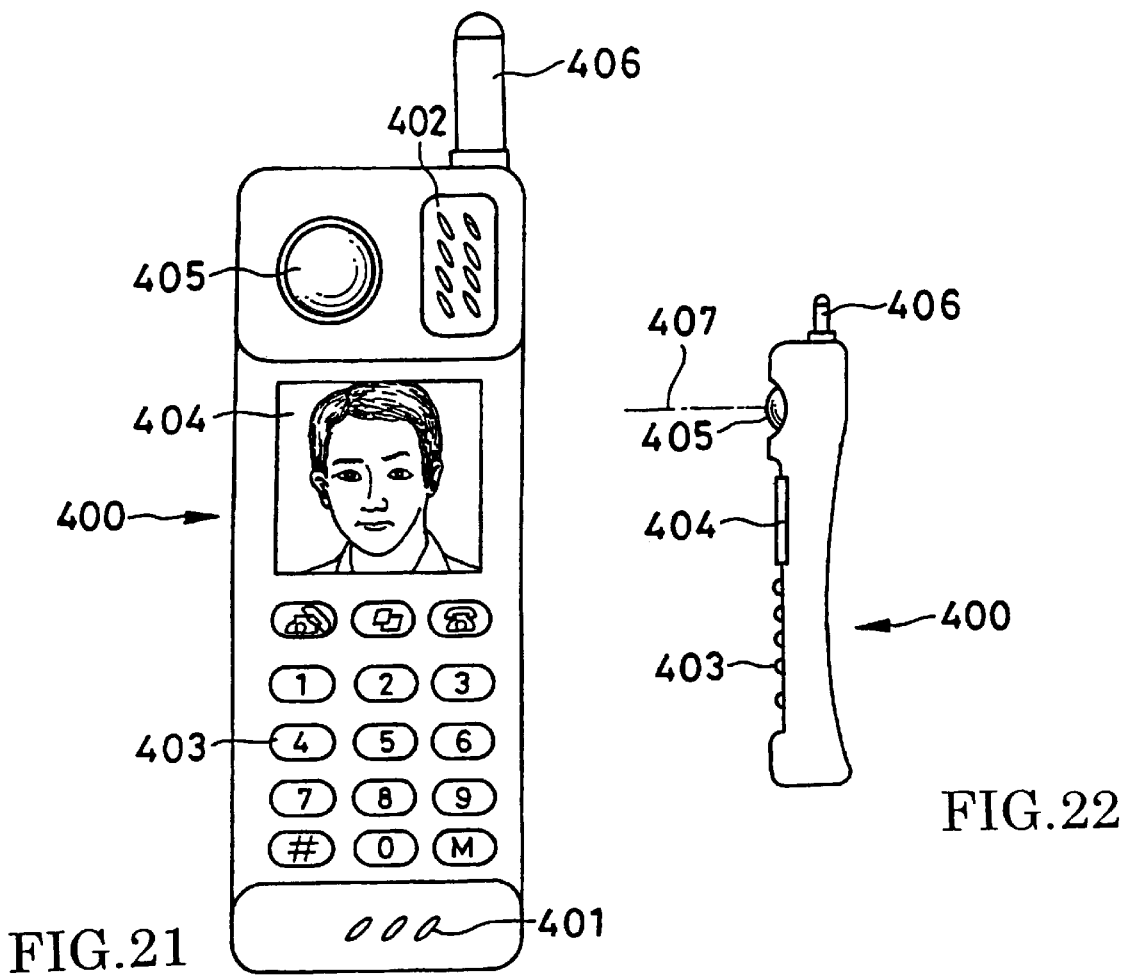
FIG. 21 is a front view of a cellular phone as an example of an electronic picture taking apparatus including a zoom lens system according to this invention.
FIG. 22 is a side view of the cellular phone shown in FIG. 21.
Figure 23:
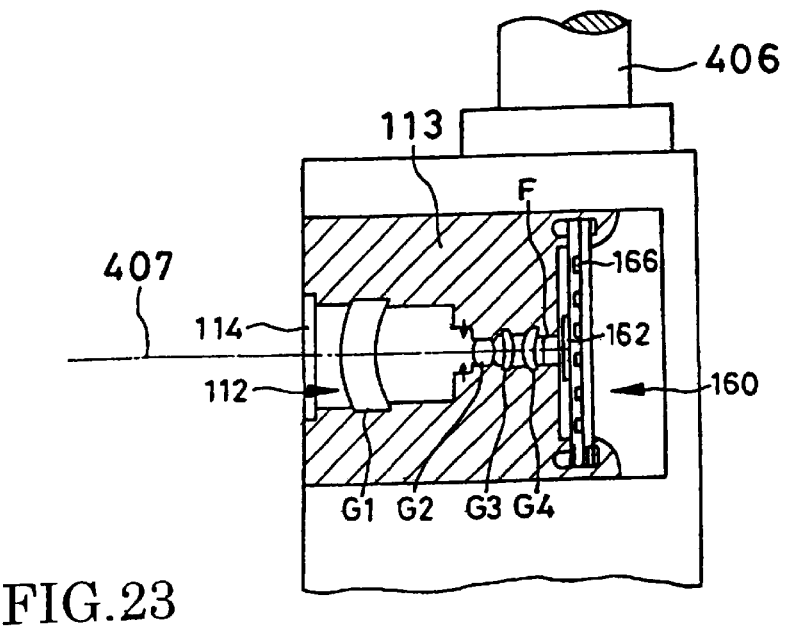
FIG. 23 is a sectional view of a picture taking optical system of the cellular phone shown in FIG. 21.

Next, a telephone including a zoom lens according to this invention as an image taking optical system, particularly, a cellular phone convenient for carrying, is described as an example of the information processing apparatus in FIGS. 21 through 23.

FIG. 21 is a front view of the cellular phone, FIG. 22 is a side view of the cellular phone, and FIG. 23 is a sectional view of the picture taking optical system 405. As shown in these figures, the cellular phone 400 has a microphone 401 for inputting voice of the user as information to the cellular phone, speaker 402 for outputting voice of the party on the other end, a dial 403 for inputting information, monitor 406 for displaying an image of the user or the party on the other end and information such as telephone number, a picture taking optical system 405, an antenna 406 for transmitting and receiving radio waves, and a processing means (not shown) for processing images, communication data, input signals, and so forth. The reference numeral 404 denotes a liquid crystal display device. The layout of these parts is not limited to the specific arrangement indicated in the figures. The picture taking optical system 405 has a zoom lens 112 (simplified in the figure) according to this invention and an image pickup device chip 162 on the picture taking optical path. These constituent elements are contained in the cellular phone 400.

The OLPF F is incorporated in the image pickup device chip 162 by adhesive to form an image pickup unit 160. The image pickup unit 160 is mountable on the rear end of the lens barrel 113 of the objective lens 112 by inserting the image pickup unit 160 into it. Therefore, adjustment for alignment of objective lens 112 and image pickup device chip 162 or space between these two parts is unnecessary and assembly of the electronic picture taking apparatus is simplified. At the front end of the lens barrel 113, a cover glass 114 is attached to protect the objective lens 112. The zooming mechanism in the lens barrel 113 is omitted in the figure.

The object image focused on the image pickup device chip 162 is supplied to the processing means (not shown) through the terminal 166, and displayed on the monitor 404 and/or on the monitor of the equipment of the party on the other end as an electronic image. The processing means also functions to convert the image information obtained by the image pickup device 162 to a signal for transmitting the image to the other party.

Although this invention has been described with respect to the examples shown in the drawings, this invention is not to be limited the above examples but, on the contrary, various modifications are possible to without departing from the spirit of this invention. All such modifications as would be obvious to one of ordinary skill in the art are intended to be included within the scope of the following claims.

What is claimed is:

1. An electronic picture taking apparatus comprising a zoom lens system and an electronic image pickup device;

said zoom lens system comprising at least four lens units, a foremost first lens unit on an object side of said zoom lens system having a negative refractive power, each of foremost three consecutive lens units having variable space on an image side thereof between an adjacent lens unit for performing a zooming operation, a rearmost lens unit of said zoom lens system consisting of a single positive lens element having an aspherical surface and being fixed during the zooming operation;

said zoom lens system including a movable aperture stop incorporated with a second lens unit disposed adjacent to said first lens unit; and said electronic picture taking apparatus satisfying the condition $$1.5 < L2/Y < 3.5$$

wherein L2 is an amount of movement of said second lens unit in the direction of an optical axis thereof while performing the zooming operation from a wide angle end to a telephoto end, and Y is a length of a diagonal line of an effective image receiving area of said image pickup device.

2. An electronic picture taking apparatus according to claim 1, wherein said first lens unit includes in order from the object side, a negative subunit consisting of two negative lens elements and a positive subunit consisting of a single positive lens element.

3. An electronic picture taking apparatus according to claim 1, wherein said first lens unit consists of, in order from the object side, a negative lens component having less than three negative lens elements, and a positive lens component having a positive lens element, and at least one negative lens element in said negative lens component has an aspherical surface.

4. An electronic picture taking apparatus according to claim 1, wherein said first and second lens units satisfy the condition $$0.6 < t1/Y < 2.2$$

and $$0.3 < t2/Y < 1.5$$

where t1 is a thickness of said first lens unit measured from a foremost surface to a rearmost surface thereof on an optical axis, and t2 is a thickness of said second lens unit measured from a foremost surface to a rearmost surface thereof on the optical axis.

5. An electronic picture taking apparatus according to claim 1, further comprising a near-infrared light blocking thin film having spectral transmittance of more than 80% at a wavelength of 600 nm and less than 10% at a wavelength of 700 nm on an optical path to said image pickup device.

6. An electronic picture taking apparatus according to claim 5, further comprising a color encoding filter array including complementary color elements provided on the image receiving area of said image pickup device.

7. An electronic picture taking apparatus according to claim 6, wherein said color encoding filter array includes a substantially similar number of at least four different colors of said filter elements, and said filter elements are arranged in a mosaic pattern such that the same color elements are not adjacent to each other.

8. An electronic picture taking apparatus according to claim 6, wherein said color encoding filter array includes green, yellow, cyan, and magenta color filter elements, said green filter element has a peak of spectral transmittance at a wavelength GP, said yellow filter element has a peak of spectral transmittance at a wavelength YP, said cyan filter element has a peak of spectral transmittance at a wavelength CP, said magenta filter element has two peaks of spectral transmittance at wavelengths MP1 and MP2, and wherein said GP, YP, CP, MP1, and MP2 satisfy the conditions $$510\ nm < GP < 540\ nm$$

and $$5\ nm < YP - GP < 35\ nm$$

and $$-100\ nm < CP - GP < -5\ nm$$

and $$430\ nm < MP1 < 480\ nm$$

and $$580\ nm < MP2 < 640\ nm.$$

9. An electronic picture taking apparatus according to claim 8, each of said green, yellow and cyan filter elements has a spectral transmittance at a wavelength of 530 nm of more than 80% of said peak spectral transmittance thereof, and said magenta filter element has a spectral transmittance at a wavelength of 530 nm between 10% and 50%, inclusive, of the larger peak spectral transmittance of said two peak spectral transmittances thereof.

10. An electronic picture taking apparatus according to claims 1, further comprising an optical low-pass filter on an optical path to said image pickup device that has a thickness tLPF satisfying the condition $$0.15 \times 10^3 < tLPF/a < 0.45 \times 10^3$$

where tLPF is a thickness of said optical low-pass filter and a is a pitch of pixel elements of said image pickup device in horizontal scanning direction thereof.

11. An electronic picture taking apparatus according claim 1, further comprising a stop member having a plurality of fixed sized openings, said plurality of fixed sized openings are alternatively insertable into an optical path between said first lens unit and a third lens unit disposed adjacent to said second lens unit to adjust an illuminance of an image formed by said zoom lens system.

12. An electronic picture taking apparatus according to claim 11, wherein one of said plurality of openings has transmittance at a wavelength of 550 nm of more than 80% and another one of said plurality of openings is equipped with a medium which has transmittance at a wavelength of 550 nm of less than 80%.

13. An electronic picture taking apparatus according to claim 12, when an effective F-number Fno' is defined by Fno'=f/(ID×SQRT(T)), the illuminance of the image such that Fno' is greater than a/0.4 μm is adjusted by inserting said opening equipped with the medium which has transmittance at a wavelength of 550 nm of less than 80% into the optical path, where f is a focal length of said zoom lens system, ID is a diameter of an opening, T is the transmittance of an opening, a is a pitch between adjacent pixel elements of said image pickup device, and SQRT means square root.

14. A picture taking apparatus according to claim 11, wherein each of said plurality of openings is equipped with a spatial frequency filter having a different spatial frequency response from each of the others.

15. An electronic picture taking apparatus comprising a picture taking optical system and an image pickup device;

said picture taking optical system comprising a first negative lens unit disposed foremost on an object side of said picture taking optical system and at least three lens units disposed on an image side of said first lens unit, each of three consecutive lens units from said first lens unit having a variable space on the image side thereof between adjacent lens units for performing a zooming operation, a rearmost lens unit of said picture taking optical system consisting of a single lens component having an aspherical surface and being fixed during both zooming and focusing, said picture taking optical system including an aperture stop moving incorporated with said second lens unit during zooming operation which is adjacent to said first lens unit.

16. An electronic picture taking apparatus according to claims 15, wherein said first lens unit moves during zooming.

* * * * *

UNITED STATES PATENT AND TRADEMARK OFFICE
CERTIFICATE OF CORRECTION

PATENT NO. : 6,643,072 B2
DATED : November 4, 2003
INVENTOR(S) : Shinichi Milhara It is certified that error appears in the above-identified patent and that said Letters Patent is hereby corrected as shown below:

Column 11,
Lines 1, 15 and 21, change "moire" to -- moiré --.

Column 17,
Line 19, change "$x=(y^2/r)/[1+SQRT(1(K+1)(y/r)^2)]+A4_y^4+A6_y^6+A8_y^8+A10_y^{10}$" to
-- $x=(y^2/r)/[1+SQRT(1-(K+1)(y/r)^2)]+A4y^4+A6y^6+A8y^8+A10y^{10}$ --.

Column 19,
Line 63, change "cd6" to -- d6 --.

Column 20,
Line 42, change "Eno" to -- Fno --.

Column 25,
Line 18, change "-100 nm<*CP-GP*<-5 nm" to -- -100 nm<CP-GP<-5 nm --.

Column 26,
Line 21, change "Fno>a/0.4=7.5" to -- Fno'>a/0.4=7.5 --.

Signed and Sealed this

Twenty-first Day of June, 2005

JON W. DUDAS
*Director of the United States Patent and Trademark Office*